United States Patent
Liu et al.

(10) Patent No.: US 11,461,998 B2
(45) Date of Patent: Oct. 4, 2022

(54) SYSTEM AND METHOD FOR BOUNDARY AWARE SEMANTIC SEGMENTATION

(71) Applicant: Samsung Electronics Co., Ltd., Suwon-si (KR)

(72) Inventors: Qingfeng Liu, San Diego, CA (US); Mostafa El-Khamy, San Diego, CA (US); Dongwoon Bai, San Diego, CA (US); Jungwon Lee, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 16/777,734

(22) Filed: Jan. 30, 2020

(65) Prior Publication Data

US 2021/0089807 A1    Mar. 25, 2021

Related U.S. Application Data

(60) Provisional application No. 62/905,907, filed on Sep. 25, 2019.

(51) Int. Cl.
    *G06K 9/36*     (2006.01)
    *G06V 10/48*     (2022.01)
    (Continued)

(52) U.S. Cl.
    CPC ........... *G06V 10/48* (2022.01); *G06K 9/6256* (2013.01); *G06N 3/08* (2013.01); *G06N 20/00* (2019.01); *G06V 10/758* (2022.01)

(58) Field of Classification Search
    CPC ........ G06K 9/6256; G06N 3/08; G06N 20/00; G06N 3/084; G06T 2207/20084
    See application file for complete search history.

(56) References Cited

U.S. PATENT DOCUMENTS 8,577,115 B2    11/2013   Gering et al.
9,865,042 B2    1/2018    Dai et al.
(Continued)

FOREIGN PATENT DOCUMENTS

CN       105844706 A     8/2016
WO   2017210690 A1    12/2017

OTHER PUBLICATIONS

Zeeshan Hayder et al., "Boundary-aware Instance Segmentation", Computer Vision Foundation, pp. 5696-5704.
(Continued)

*Primary Examiner* — Solomon G Bezuayehu
(74) *Attorney, Agent, or Firm* — Lewis Roca Rothgerber Christie LLP

(57) ABSTRACT

Some aspects of embodiments of the present disclosure relate to using a boundary aware loss function to train a machine learning model for computing semantic segmentation maps from input images. Some aspects of embodiments of the present disclosure relate to deep convolutional neural networks (DCNNs) for computing semantic segmentation maps from input images, where the DCNNs include a box filtering layer configured to box filter input feature maps computed from the input images before supplying box filtered feature maps to an atrous spatial pyramidal pooling (ASPP) layer. Some aspects of embodiments of the present disclosure relate to a selective ASPP layer configured to weight the outputs of an ASPP layer in accordance with attention feature maps.

18 Claims, 13 Drawing Sheets
(1 of 13 Drawing Sheet(s) Filed in Color)

(51) Int. Cl.
  G06K 9/62 (2022.01)
  G06N 3/08 (2006.01)
  G06N 20/00 (2019.01)
  G06V 10/75 (2022.01)

(56) References Cited

U.S. PATENT DOCUMENTS

| | | | |
|---|---|---|---|
| 9,978,003 B2 | 5/2018 | Sachs et al. | |
| 2018/0268548 A1* | 9/2018 | Lin | G06N 3/0454 |
| 2019/0065817 A1* | 2/2019 | Mesmakhosroshahi | G06V 10/454 |
| 2019/0294661 A1* | 9/2019 | Sarkar | G06N 3/08 |
| 2020/0175700 A1* | 6/2020 | Zhang | G06T 7/194 |
| 2020/0218948 A1* | 7/2020 | Mao | G06K 9/6232 |
| 2020/0272888 A1* | 8/2020 | Wang | G06N 3/08 |
| 2021/0049756 A1* | 2/2021 | He | G06N 3/0454 |
| 2021/0125338 A1* | 4/2021 | Zhang | G06T 7/11 |

OTHER PUBLICATIONS

Hanchao Li et al., "Pyramid Attention Network For Semantic Segmentation", Nov. 25, 2018, 13 pgs, arXiv:1805.10180v3 [cs.CV], Beijing, CN.

D. Marmanis et al., "Classfication with an edge: improving semantic image segmentation with boundary detection", Dec. 21, 2017, 37 pgs, arXiv:1612.01337v2 [cs.CV], Munchen, Germany.

Chen-Wei Xie et al., "Vortex Pooling: Improving Context Representation in Semantic Segmentation", Apr. 22, 2018, 9 pgs, arXiv:1804.06242v2 [cs.CV], China.

Wenqi Shao et al., "SSN: Learning Sparse Switchable Normalization via SparsestMax", Mar. 9, 2019, 10 pgs, arXiv:1903.03793v1 [cs.CV], The Chinese University of Hong Kong.

Liang-Chieh Chen et al., "Encoder-Decoder with Atrous Separable Convolution for Semantic Image, Segmentation", Feb. 7, 2018, 11 pgs, arXiv:1802.02611v1 [cs.CV].

Jun Fu et al., "Dual Attention Network for Scene Segmentation", 2019 IEEE/CVF Conference on Computer Vision and Pattern Recognition (CVPR), pp. 3141-3149.

Andre F. T. Martins et al., "From Softmax to Sparsemax: A Sparse Model of Attention and Multi-Label Classification", Feb. 5, 2016, 13 pgs, arXiv:1602.02068v1 [cs.CL].

Gabriela Csurka et al., "What is a good evaluation measure for semantic segmentation?", Computer Vision Group Xerox Research Centre Europe, 11pgs, 2013, Meylan, France.

David R. Martin et al., "Learning to Detect Natural Image Boundaries Using Local Brightness, Color, and Texture Cues", IEEE Transactions On Pattern Analysis And Machine Intelligence, vol. 26, No. 5, May 2004, pp. 530-549.

Jie Hu et al., "Squeeze-and-Excitation Networks", IEEE/CVF Conference on Computer Vision and Pattern Recognition, 2018, pp. 7132-7141.

Xiang Li et al., "Selective Kernel Networks", IEEE/CVF Conference on Computer Vision and Pattern Recognition (CVPR), 2019, pp. 510-519.

\* cited by examiner

SYSTEM AND METHOD FOR BOUNDARY AWARE SEMANTIC SEGMENTATION

CROSS-REFERENCE TO RELATED APPLICATION(S)

This application claims priority to and the benefit of U.S. Provisional Patent Application No. 62/905,907, filed in the United States Patent and Trademark Office on Sep. 25, 2019, the entire disclosure of which is incorporated by reference herein.

FIELD

Aspects of embodiments of the present disclosure relate to the field of computer vision, including specifically a system and method for boundary aware semantic segmentation.

BACKGROUND

Scene classification refers to the process of perceiving a natural scene and understanding the content of the scene. A human may perceive a scene with their eyes and identify salient aspects of the scene (e.g., people in front of a landmark or a tourist attraction). In the context of computer vision, scene classification may include capturing one or more images of a scene using a camera and identifying the elements of the scene. Semantic segmentation refers to the process of identifying portions or regions of the images that correspond to particular classes of objects (e.g., people, buildings, and trees).

SUMMARY

Aspects of embodiments of the present disclosure relate to systems and methods for semantic segmentation of input images.

According to one embodiment, a system for training a machine learning model includes: a processor; and memory storing instructions that, when executed by the processor, cause the processor to: receive training data including a plurality of input images and a corresponding plurality of ground truth segmentation maps, where each pixel of the ground truth segmentation maps classifies a corresponding pixel of a corresponding one of the input images as belonging to one of c different class labels; extract a plurality of boundary maps identifying a plurality of boundary regions between different class labels in corresponding ones of the ground truth segmentation maps; initialize a plurality of parameters for the machine learning model; compute a plurality of model output logits using the machine learning model configured with the parameters; compute a loss based on the model output logits, corresponding ones of the ground truth segmentation maps, and corresponding ones of the boundary maps in accordance with a boundary aware loss function; and update the parameters in accordance with the loss.

The memory may further store instructions that, when executed by the processor, cause the processor to expand the boundary regions of the boundary maps.

Expanding the boundary regions may include labeling all pixels within a threshold distance of the boundary as part of the boundary region with equal value.

Expanding the boundary regions may include labeling each pixel of the boundary map with a value computed as a function of a distance of the pixel to a closest boundary of a plurality of boundaries between different class labels, and the value may be larger when the pixel is closer to the closest boundary and smaller when the pixel is farther from the closest boundary.

The boundary aware loss function L may be defined as, for a given input image of the input images, a given corresponding ground truth segmentation map of the ground truth segmentation maps, a given corresponding boundary map of the boundary maps, and a corresponding model output logits of the plurality of model output logits:

$$L = -\sum_i (w(c_i) + \lambda v(c_i) m_i) y_i^t \log(p_i)$$

wherein $c_i$ is a class label of an i-th pixel of the given corresponding ground truth segmentation map, $w(c_i)$ is a weight corresponding to the class label of the i-th pixel, $\lambda$ is a scalar, $v(c_i)$ is the weight corresponding is the class label of the i-th pixel when the i-th pixel is in a boundary region, $m_i$ is a value of the i-th pixel of the corresponding boundary map, $y_i$ is a one-hot vector encoding of the class label $c_i$ of the c different classes, $y_i^t$ is a matrix transpose of $y_i$, and $p_i$ is a vector of confidence values of the corresponding model output logits corresponding to the i-th pixel.

$v(c_i)$ may be weighted in accordance with relative sizes of the c classes.

$v(c_i)$ may be weighted in accordance with an inverse of corresponding lengths of boundaries of the class label $c_i$ in the ground truth segmentation map.

According to one embodiment, a system implementing a neural network configured to perform semantic segmentation of an input image includes: a processor; and memory storing instructions that, when executed by the processor, cause the processor to implement a deep convolutional neural network (DCNN), the DCNN including: a backbone neural network configured to compute a backbone feature map from the input image; an atrous spatial pyramidal pooling (ASPP) layer including a plurality of dilated convolutional layers configured to compute a plurality of ASPP output feature maps based on the backbone feature map, each of the dilated convolutional layers having a corresponding dilation rate; a box filtering layer including a plurality of box filtering sublayers, each of the box filtering sublayers being located between the backbone neural network and a corresponding one of the dilated convolutional layers and having a box filtering kernel with a window size corresponding to the dilation rate of the corresponding one of the dilated convolutional layers, the box filtering layer being configured to: compute a plurality of box filtered feature maps from the backbone feature map; and supply the box filtered feature maps as input to the ASPP layer; and an output neural network configured to compute a segmentation map of the input image based on the ASPP output feature maps.

The window size of each of the box filtering sublayers may be set in accordance with:

$$F = \left\lceil \frac{d-1}{2} \right\rceil \times 2 + 1$$

wherein the window size is F×F, and wherein d is the dilation rate of the corresponding one of the dilated convolutional layers.

According to one embodiment, a system implementing a neural network configured to perform semantic segmentation of an input image includes: a processor; and memory storing instructions that, when executed by the processor, cause the processor to implement a deep convolutional neural network (DCNN), the DCNN including: a backbone neural network configured to compute a backbone feature map from an input image; an atrous spatial pyramidal pooling (ASPP) layer including a plurality of dilated convolutional layers configured to compute a plurality of ASPP output features based on the backbone feature map, each of the dilated convolutional layers having a corresponding dilation rate; a selective ASPP layer configured to weight a plurality of selective ASPP channels in accordance with a plurality of corresponding attention feature maps to compute a plurality of selective ASPP output feature maps, the selective ASPP channels including the ASPP output features; and an output neural network configured to compute a segmentation map of the input image based on the ASPP output feature maps.

The DCNN may further include a global attention layer configured to compute a global attention feature map based on the backbone feature map in parallel with the dilated convolutional layers, and the selective ASPP channels may include the global attention feature map.

The global attention layer may be configured to: compute a first feature map from the backbone feature map using a $1 \times 1 \times C \times C_{out}$ convolutional layer; compute a normalized attention map by applying a sparsemax function to pairwise correlations of the first feature map; compute a second feature map from the backbone feature map using a $1 \times 1 \times C \times C$ convolutional layer; multiply the second feature map by the normalized attention map to compute a third feature map; reshape the third feature map to match dimensions of the backbone feature map; and add the reshaped third feature map to the backbone feature map to compute a global attention feature map, wherein C is a number of channels of the backbone feature map and $C_{out}$ is a reduced dimension of the $1 \times 1 \times C \times C_{out}$ convolutional layer.

The selective ASPP layer may be configured to: concatenate the selective ASPP channels to compute concatenated features; compute global context information of the concatenated features for each channel using global average pooling; reduce a dimension of the global context information using a fully connected neural network layer; apply a non-linear activation function to the dimensionally reduced global context information; for each of the selective ASPP channels, supplying the output of the non-linear activation function a plurality of fully connected neural networks, each of the fully connected neural networks being configured to compute a corresponding one of plurality of attention feature maps, each of the attention feature maps having dimensions matching a corresponding one of the selective ASPP channels; and weight each of the selective ASPP channels based on a corresponding one of the attention feature maps to compute the selective ASPP output feature maps.

The selective ASPP layer may be further configured to normalize the attention feature maps.

The non-linear activation function may be a rectified linear unit (ReLU) function.

The output neural network may include a 1×1 convolutional layer.

The output neural network may include a spatial attention refinement layer configured to: compute a first feature map from the backbone feature map using a $1 \times 1 \times C \times C_{out}$ convolutional layer; compute a normalized attention map by applying a normalization function to pairwise correlations of the first feature map; compute a second feature map from the backbone feature map using a $1 \times 1 \times C \times C$ convolutional layer; multiply the second feature map by the normalized attention map to compute a third feature map; reshape the third feature map to match dimensions of the backbone feature map; and add the reshaped third feature map to the backbone feature map to compute the segmentation map, wherein C is a number of channels of the backbone feature map and $C_{out}$ is a reduced dimension of the $1 \times 1 \times C \times C_{out}$ convolutional layer.

The DCNN may further include a box filtering layer including a plurality of box filtering sublayers, each of the box filtering sublayers being located between the backbone neural network and a corresponding one of the dilated convolutional layers and having a box filtering kernel with a window size corresponding to the dilation rate of the corresponding one of the dilated convolutional layers.

The window size of each of the box filtering sublayers may be set in accordance with:

$$F = \left\lceil \frac{d-1}{2} \right\rceil \times 2 + 1$$

wherein the window size is F×F, and wherein d is the dilation rate of the corresponding one of the dilated convolutional layers.

The DCNN may compute a plurality of model output logits, wherein the DCNN is trained using a boundary aware loss function and based on training data comprising a plurality of input images and a corresponding plurality of ground truth segmentation maps, where each pixel of the ground truth segmentation maps classifies a corresponding pixel of a corresponding one of the input images as belonging to one of c different class labels, each of the ground truth segmentation maps comprising a plurality of domains, each domain corresponding to a contiguous portion of the ground truth segmentation wherein all pixels in the contiguous portion have a same one of the c different class labels and based on a plurality of boundary maps, where each boundary map identifies boundary regions between different ones of the plurality of domains in a corresponding one of the ground truth segmentation maps, and the boundary aware loss function L may be defined as, for a given input image of the input images, a given corresponding ground truth segmentation map of the ground truth segmentation maps, a given corresponding boundary map of the boundary maps, and a corresponding model output logits of the plurality of model output logits:

$$L = -\sum_i (w(c_i) + \lambda v(c_i) m_i) y_i^t \log(p_i)$$

wherein $c_i$ is a class label of an i-th pixel of the corresponding ground truth segmentation map, $w(c_i)$ is a weight corresponding to the class label of the i-th pixel, $\lambda$ is a scalar, $v(c_i)$ is the weight corresponding is the class label of the i-th pixel when the i-th pixel is in a boundary region, $m_i$ is a value of the i-th pixel of the corresponding boundary map, $y_i$ is a one-hot vector encoding of the class label $c_i$ of the c different classes, $y_i^t$ is a matrix transpose of $y_i$, and $p_i$ is a vector of confidence values of the corresponding model output logits corresponding to the i-th pixel.

The DCNN may further include a selective attention network configured to: compute concatenated features by concatenating: a backbone feature map input computed based on the backbone feature map; and a selective attention input computed based on the segmentation map computed by the output neural network; compute global context information of the concatenated features for each channel using global average pooling; reduce a dimension of the global context information using a fully connected neural network layer; apply a non-linear activation function to the dimensionally reduced global context information; for each of the backbone feature map input and the selective attention input, supply the output of the non-linear activation function to a corresponding one of a plurality of fully connected neural networks, each of the fully connected neural networks being configured to compute a corresponding one of plurality of selective attention feature maps, each of the selective attention feature maps having dimensions matching a corresponding one of the backbone feature map input and the selective attention input; and weight the backbone feature map input and the selective attention input based on a corresponding one of the selective attention feature maps to compute a plurality of selective attention network feature maps.

The selective attention network may be further configured to compute the backbone feature map input by applying a 1×1 convolution to the backbone feature map.

The selective attention network may be further configured to compute the selective attention input by resizing the segmentation map computed by the output neural network.

The resizing may be performed by applying bilinear upsampling.

The spatial attention network may include an output network configured to: concatenate the selective attention network feature maps to compute concatenated feature maps; apply a 3×3 convolution to the concatenated feature maps to compute a convolutional output; and resize the convolutional output of the 3×3 convolution to compute a second segmentation map.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate exemplary embodiments of the present disclosure, and, together with the description, serve to explain the principles of the present disclosure.

DETAILED DESCRIPTION

In the following detailed description, only certain exemplary embodiments of the present disclosure are shown and described, by way of illustration. As those skilled in the art would recognize, the disclosure may be embodied in many different forms and should not be construed as being limited to the embodiments set forth herein.

According to one embodiment, the present disclosure describes a system and method for fast and accurate instance semantic segmentation. The present system and method provide instance segmentation based on pixel-wise labeling of classes for each instance of an object class in the image. In some embodiments, the present process generates a segmentation map of an input image, where each pixel in the image is classified with a class from a set of predefined classes (e.g., person, animal, vehicle, vegetation, water, building, and the like). The predicted semantic segmentation map may be used to improve an image signal processing chain by providing semantic information and the locations of those identified objects in the image.

For example, semantic segmentation of an image of a street scene may label all of the pixels associated with each car in the scene with the label of "car," all of the pixels associated with a person on a bicycle with the label "bicycle," may label all of the pixels associated with people walking in the scene with the label of "pedestrian," and may label all of the pixels corresponding to pavement suitable for driving with the label of "pavement."

Figure 1:
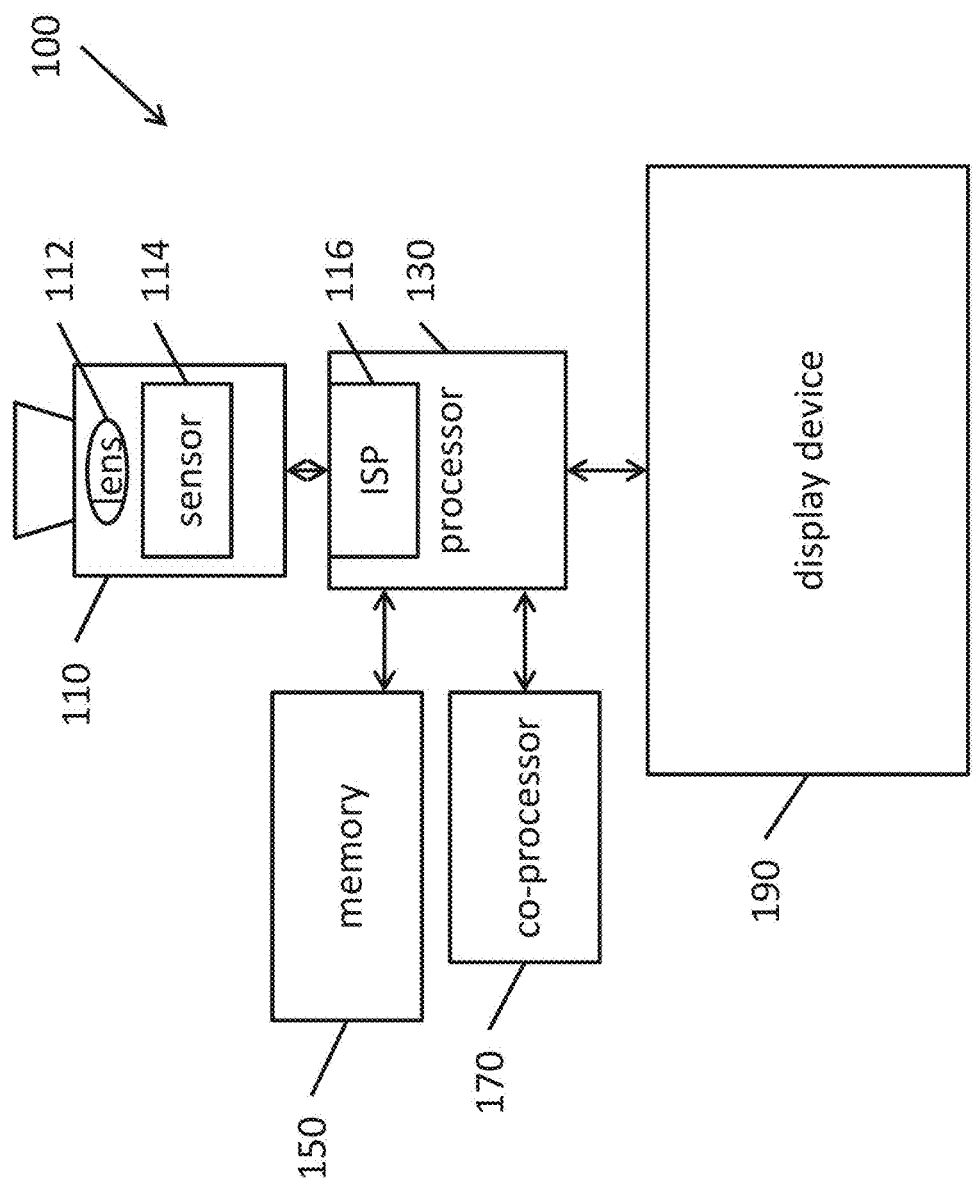
FIG. 1 is a block diagram of an example of a digital camera system, according to one embodiment.

Some applications of embodiments of the present disclosure relate to use with, for example, a standalone digital camera or a digital camera integrated into a smartphone or other device such as an autonomous vehicle. FIG. 1 is a block diagram of an example of a digital camera system, according to one embodiment. A digital camera system 100, in accordance with some embodiments of the present disclosure, may be components of, for example, a standalone digital camera or a smartphone. For the sake of clarity, a digital camera system 100 generally includes a digital camera 110 including a lens 112 mounted in front of an image sensor 114 (e.g., a complementary metal oxide semiconductor (CMOS) image sensor). The digital camera system 100 may further include a processor 130 (or an image signal processor (ISP)) configured to receive data captured by the digital camera 110 (e.g., image data of a scene), and may store the received data in memory 150. The memory 150 may include dynamic random access memory (DRAM) and/or persistent memory (e.g., flash memory). In some circumstances, the image signal processor 116 is integrated into the processor 130. In some embodiments, the digital camera system 100 further includes a co-processor 170 such as a field programmable gate array (FPGA), a graphical processing unit (GPU), a vector processor, or a neural processing unit. In some embodiments, the co-processor and/or memory 150 is integrated with the processor 130 (e.g., on the same die), such as in the case of a system on a chip (SoC).

When operating a digital camera, in many circumstances, the digital camera 110 continually captures images of the scene. For example, the digital camera system 100 may show the continually captured images on a display device 190 to provide a user (e.g., a photographer) with a real-time preview of the view through the lens based on current capture settings, such as focus, aperture, shutter speed, sensor gain (e.g., ISO), white balance, and the like.

In embodiments where semantic segmentation is used with a digital camera system, the classifications of the pixels in the images may be used to provide automatic adjustment of capture settings (e.g., focus, exposure, and sensor gain) to improve the capture of salient portions of the image (e.g., improve the exposure of the faces of people in the image, at the expense of the exposure of backgrounds).

In more detail, various aspects of embodiments of the present disclosure relate to systems and methods for improving the computation of a segmentation map of an input image. Some aspects of embodiments of the present disclosure relate to a boundary aware semantic segmentation method including a boundary aware loss function that emphasizes the importance of boundary pixels (e.g., pixels at the boundaries between different semantic classes). Another aspect of embodiments of the present disclosure relates to a box filtering based dilated convolution neural network that reduces information loss when using a comparative Atrous Spatial Pyramid Pooling (ASPP) method (see, e.g., L.-C. Chen, G. Papandreou, I. Kokkinos, K. Murphy, and A. L. Yuille. Deeplab: Semantic image segmentation with deep convolutional nets, atrous convolution, and fully connected crfs. arXiv:1606.00915, 2016). Another aspect of embodiments of the present disclosure relates to an attention aware atrous spatial pyramid pooling (AAASPP) technique, which computes a global attention feature that reduces the impact of unimportant or noisy features, thereby making the features more robust.

Accordingly, aspects of embodiments of the present disclosure relate to various systems and methods that can be used independently and/or in conjunction to improve the performance of a machine learning model. In more detail, some aspects of the present disclosure are generally applicable to semantic segmentation, and other aspects are applicable to deep convolutional neural networks (DCNN).

Boundary Aware Semantic Segmentation

One aspect of embodiments of the present disclosure relates to a machine learning model trained to perform semantic segmentation of input images, where the model is trained using a loss function that considers the importance of boundaries. Such a loss function will be referred to herein as a "boundary aware" loss function. Comparative semantic segmentation techniques generally focus on per pixel classification and use the softmax cross entropy loss function. However, such an approach ignores the boundary information in the semantic segmentation map. Using a boundary aware loss function in accordance with embodiments of the present disclosure improves the performance of the resulting model when performing semantic segmentation versus a model trained using a comparative loss function that is not boundary-aware. While various embodiments are presented in this disclosure in relation to deep convolutional neural networks (DCNNs), embodiments are not limited thereto and boundary aware loss function in accordance with embodiments of the present disclosure can be used to provide attention to the segmentation border when training any machine learning model in which the boundaries between different classes is important.

Generally speaking, a loss function is used to provide feedback during the training of a machine learning model. Evaluating a loss function broadly involves comparing the current output of the model (the current prediction) against labeled ground truth data to compute a value, where the value is near zero if the prediction is close to the ground truth and has a large magnitude if the prediction is far from the ground truth.

Figure 2A:
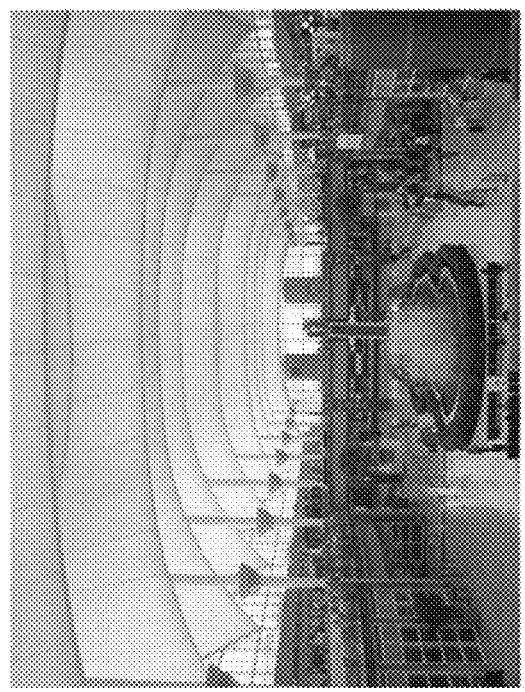
FIG. 2A is an example of an input image.
Figure 2B:
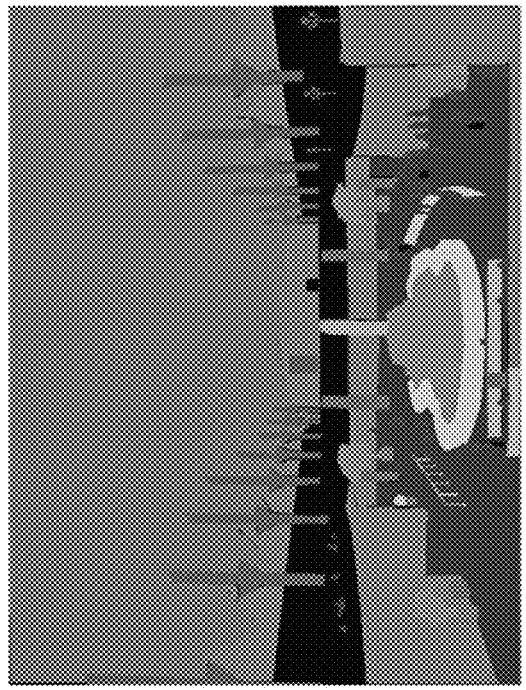
FIG. 2B is an example of a ground truth segmentation map corresponding to the input image of FIG. 2A.

FIG. 2A is an example of an input image of an airport concourse. FIG. 2B is an example of a ground truth segmentation map corresponding to the input image of FIG. 2A. In FIG. 2B, different colors of the ground truth segmentation map identify different classes of objects, such as maroon for "people," bright green for "plants," blue green for "water," gray for "walls," and the like. The ground truth segmentation map may be generated manually from the input image (e.g., by humans manually labeling the pixels). As seen in FIG. 2B, the segmentation map generally includes a plurality of different "domains" where neighboring pixels in a contiguous portion of the segmentation map are all part of the same class (e.g., each person may correspond to a domain, and each plant may correspond to a domain, but when two objects of the same class overlap in the input image, the two objects may form part of the same domain in the segmentation map).

In the case of training a machine learning model to compute (or predict) a segmentation map for a given input image, such as the image shown in FIG. 2A, the prediction output by the machine learning model is compared against the ground truth model using the loss function. The output of the loss function, at each pixel, is then used to update the parameters (e.g., weights and biases) that configure the machine learning model using, for example, gradient descent (and backpropagation, in the case of a neural network machine learning model).

A boundary aware loss function according to some aspects of the present disclosure penalizes wrong predictions along the boundaries. For example, the boundary aware loss function may compute greater losses for wrong predictions along the boundaries than in regions outside of the boundaries (e.g., in the interior of domains corresponding to particular classes). For the sake of convenience, the following notation will be used herein: for a given input image, M represents the ground truth boundary map where the i-th pixel of the boundary map is $m_i$ (e.g., in some embodiments, the ground truth boundary map is in image where all of the pixels in the boundary regions between different domains of a ground truth segmentation map corresponding to different classes have a value such as 1 and the pixels within the domains of the classes have a different value such as 0), c represents the number of different predefined classes of objects (e.g., "people," "walls," "water," "plants," etc.), $p_i \in R^c$ is the output of the model (e.g., model output logits) at the i-th pixel of the input image where the model outputs a vector of c difference confidence values (e.g., values ranging from 0 to 1) that the i-th pixel of the input image depicts each of the c classes, $y_i \in R^c$ is the one-hot vector encoding of the ground truth (e.g., where the value is 1 for the class corresponding to the ground truth class and 0 for all other classes), $w(c_i)$ is the weight of each pixel where $c_i$ is the class label that pixel i belongs to (e.g., some important objects, such as people, may be relatively small in the image, and therefore may be weighted higher to balance out large, but less salient classes such as "sky" or "ground" or "walls"), $\lambda$ is a scalar that controls the degrees of penalties of wrong predictions along the boundaries, and $v(c_i)$ is the weights for the boundary pixels.

According to some embodiments, the boundary aware softmax cross entropy function L is then defined as follows:

$$L = -\sum_i (w(c_i) + \lambda v(c_i)m_i) y_i^t \log(p_i)$$

where $y_i^t$ is the matrix transpose of $y_i$.

According to some embodiments, the index i is summed over all the pixels. In various embodiments, the weights $v(c_i)$ for the boundary pixels can have various values—for example, in some embodiments $v(c_i)$ is 0.0 for the boundary pixels in the unlabeled region and 1.0 for all the other boundary pixels. In some embodiments, $v(c_i)$ can also be weighted to consider the imbalance of classes in a manner similar to $w_i$. For example, in some embodiments, to address the imbalance of boundary pixels, $v(c_i)$ is set to the inverse of the lengths of the boundaries for the class which the pixel belongs to.

Figure 2C:
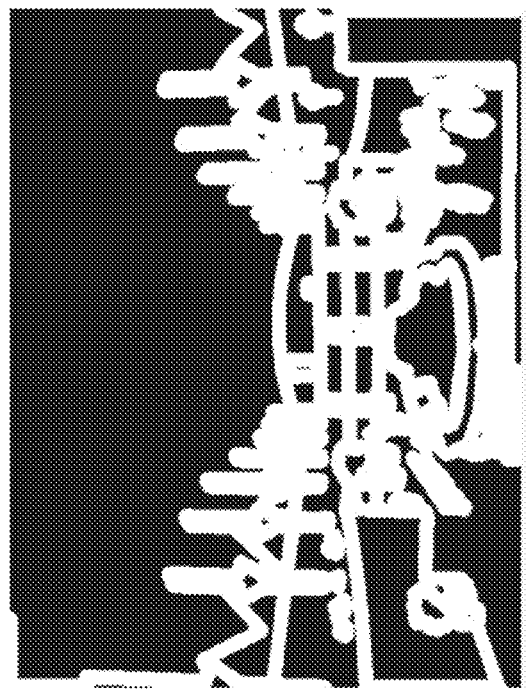
FIG. 2C is a depiction of a dilated boundary map M corresponding to the input image of FIG. 2A, according to one embodiment of the present disclosure.

FIG. 2C is a depiction of a dilated boundary map M corresponding to the input image of FIG. 2A, according to one embodiment of the present disclosure.

Figure 2D:
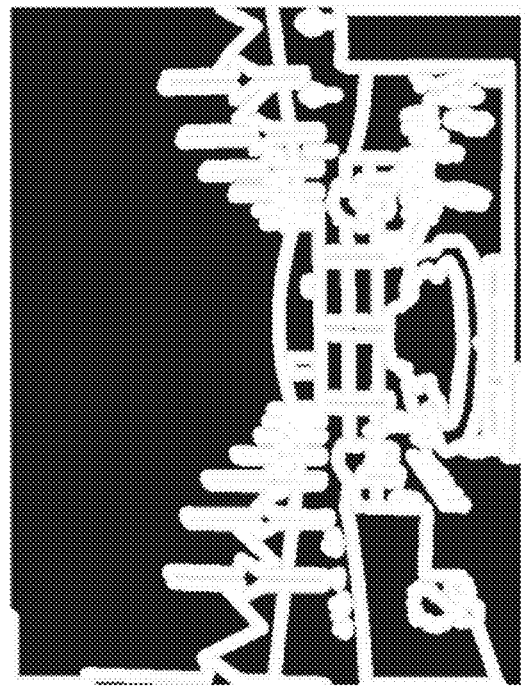
FIG. 2D is a depiction of a dilated boundary map M based on a distance transform corresponding to the input image of FIG. 2A, according to one embodiment of the present disclosure.

FIG. 2D is a depiction of a dilated boundary map M based on a distance transform corresponding to the input image of FIG. 2A, according to one embodiment of the present disclosure.

Figure 3:
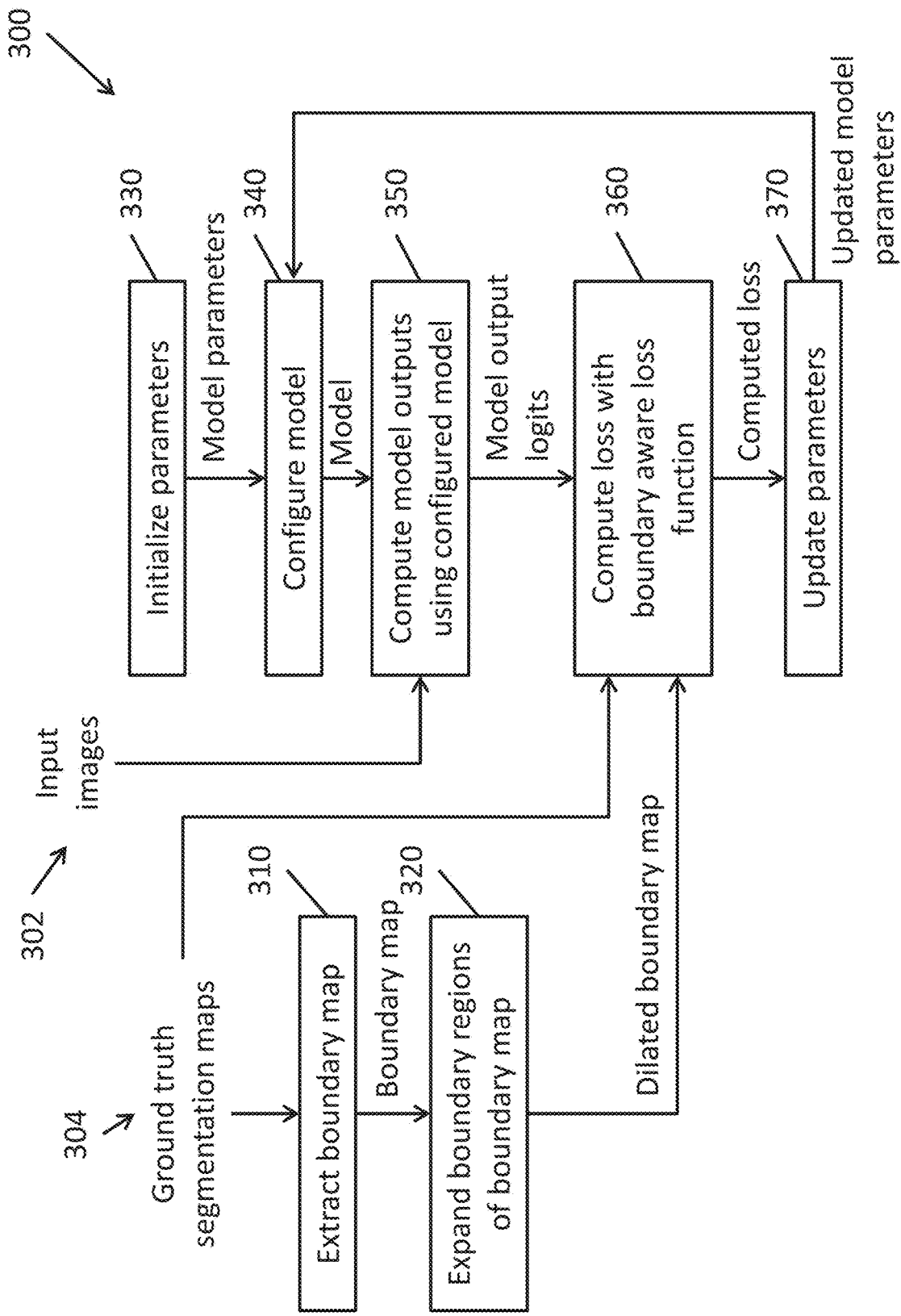
FIG. 3 is a flowchart of a portion of a process for training a machine learning model to compute a segmentation map, according to one embodiment of the present disclosure.

FIG. 3 is a flowchart of a portion of a method 300 for training a machine learning model to compute a segmentation map, according to one embodiment of the present disclosure. The training of a machine learning model may be performed using an appropriate computer system, such as one or more computers, each of which may include a general purpose processor and one or more co-processors (e.g., a graphics processing unit or GPU, a field programmable gate array or FPGA, a vector processing unit, and the like), along with memory storing the instructions to execute the method shown in FIG. 3. In addition, the memory of the computer system may further store training data for training the model, the machine learning model, and model parameters for configuring the model, as well as other state information (e.g., other training parameters and intermediate values).

As shown in FIG. 3, input training data may include input images 302 (such as the image shown in FIG. 2A) and corresponding ground truth segmentation maps 304 (such as the image shown in FIG. 2B). During preparation of the training data, at 310, the computer system extracts boundary maps from the ground truth segmentation maps. In some embodiments, the boundary map is extracted by applying an appropriate edge detection filter (e.g., the Sobel filter) to the corresponding ground truth segmentation maps 304. In some embodiments, the boundary map is generated by labeling a pixel of the boundary map with the value 1 if the corresponding pixel of the segmentation map (e.g., the pixel at the same coordinates in the segmentation map) is adjacent to any pixels of a different class than the corresponding pixel and labeling the pixel with the value 0 otherwise (e.g., if all adjacent pixels belong to the same class as the corresponding pixel).

In some embodiments, the computer system expands the boundary regions of the boundary maps at 320 to generate dialed boundary maps. The expansion of the boundary regions is used to introduce error tolerance during the training to make the resulting model more robust.

In some embodiments, the pixels close to the boundaries are checked to determine whether their Euclidean distances are within a threshold of the actual boundary (this is equivalent to a morphological dilation operation with a disk kernel). Pixels within the threshold distance are labeled as 1 (e.g., labeled as part of the boundary region with equal weight), while all others are labeled as 0 (e.g., labeled as part of the boundary region with equal weight). As a result, the boundaries are expended uniformly as shown, for example, in FIG. 2C, and $m_i \in \{0,1\}$.

In some embodiments of the present disclosure, instead of having all $m_i \in \{0,1\}$, the value of $m_i$ is calculated as a function of the distance from the i-th pixel to the closest boundary such that the value of $m_i$ is larger when the i-th pixel is closer to the boundary and smaller when the i-th pixel is farther from the closest boundary. In some embodiments, the expansion of the boundary map is performed by applying a distance transform on the binary boundary map (e.g., computed based on threshold distance, as described above). In various embodiments of the present disclosure, the distance between the pixel and the closest boundary may be computed based on, for example: Euclidean distance; city block (or Manhattan) distance; or a Gaussian transform of the Euclidean distance.

At 330, the computer system initializes a plurality of parameters for the machine learning model. This may involve, for example, initializing weights and biases of neurons of a neural network to random values, or, as another example, initializing coefficients of a regression model to random values. At 340, the computer system configures the model using the plurality of parameters.

At 350, the computer system computes a plurality of model output logits using the machine learning model as configured with the plurality of parameters. The model output logits may represent a raw output of the machine learning model, and may be interpreted as the confidence of the model with respect to the possible output classes. For example, if the input image has dimensions H×W, and if there are C different classes, then the model may compute C different confidence values for each of pixel of the input image, representing the confidence that each given pixel is a member of, or corresponds to, a given class. (E.g., for each pixel, the model may output confidences that the pixel is part of a "plant," part of a "wall," part of a "person," and part of a "wall."). As a result, the model output logits may have dimensions H×W×C for a single input image of dimensions H×W. As one concrete example, in the case where the machine learning model is a neural network, computing the model output logits may include supplying an input image (e.g., from the training set) to the configured model and forward propagating the calculations through the layers of the neural network.

At 360, the computer system computes a loss based on the model output logits, the corresponding ground truth segmentation maps, and the boundary maps in accordance with a boundary aware loss function. One example of a boundary aware loss function is discussed above in accordance with a boundary aware softmax cross entropy function L. However, embodiments of the present disclosure are not limited thereto and boundary aware loss functions in accordance with embodiments of the present disclosure also include other loss functions that use boundary maps to apply greater weight (e.g., computer greater losses) for pixels at the boundaries (e.g., in the boundary regions) between different domains of classes than pixels in the interiors of the domains of classes (which may receive a lower, non-zero weight or zero weight).

At 370, the computer system updates the plurality of parameters in accordance with the computed loss. For example, gradient descent may be used to adjust the parameters, where losses of larger magnitude result in larger changes in the parameters and losses of smaller magnitude result in smaller changes in the parameters. In the case of neural networks, backpropagation may be used to update the parameters through all of the layers of the network. The computer system may then reconfigure the model at 340 using the updated parameters and repeat the process of computing model logits, computing the loss, and updating the parameters for a specified number of training periods or until the model reaches a specified level of performance on the training data.

Accordingly, aspects of embodiments of the present disclosure relate to a boundary aware loss function for training a machine learning model to compute a semantic segmentation map of an input image, and systems and methods using boundary aware loss functions in accordance with embodiments of the present disclosure.

Box Filtering Based Dilated Convolution

Some aspects of embodiments of the present disclosure relate to performing dilated convolution using box filtering. Generally speaking, a convolutional neural network includes one or more convolutional layers, in which the input to a convolutional layer is convolved with one or more convolutional kernels of learned weights, where the convolutional kernel is smaller than the input to the layer. A typical size of a convolutional kernel may be 3×3 pixels and 5×5 pixels. Accordingly, each pixel or location in the output of a convolutional layer has a receptive field of the 3×3 pixels or the 5×5 pixels of the input to the layer.

Figure 4A:
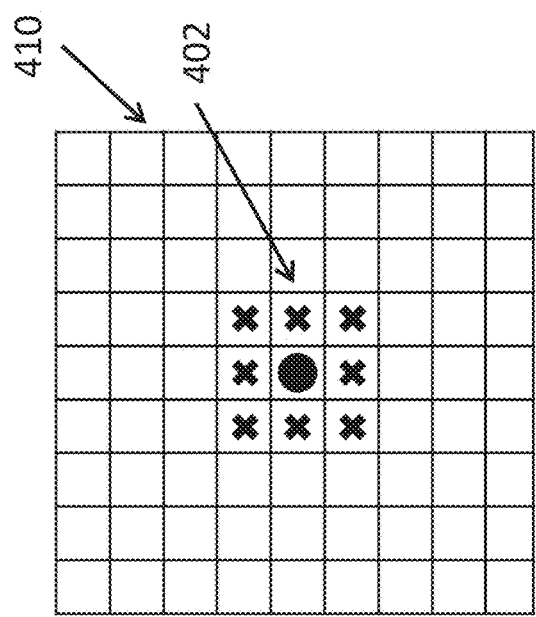
FIG. 4A depicts the selection of pixels during standard convolution using a convolutional kernel of size 3×3 pixels.

FIG. 4A depicts the selection of pixels during standard convolution using a convolutional kernel of size 3×3 pixels. As shown in FIG. 4A, a convolutional kernel 402 selects the eight pixels (shown with Xs) that are adjacent to the center pixel (shown with a circle) from an input feature map 410 to a convolutional layer of a neural network (e.g., a backbone feature map output by a backbone neural network). The convolutional layer multiplies each of the values of the selected pixels by corresponding weights at the nine positions of the convolutional kernel, and then sums the weighted values to compute a value (or feature) of an output of the convolutional layer, where the computed value placed in a position (e.g., coordinates) in the output that corresponds to the location of the center pixel in the input feature map 410. As seen in FIG. 4A, this approach generally causes the features computed by a convolutional layer to be highly localized, as only the eight pixels immediately surrounding the center pixel are considered when computing each feature.

Figure 4B:
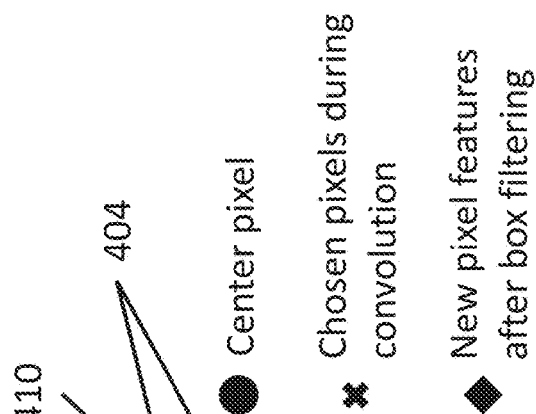
FIG. 4B depicts the selection of pixels using dilated convolution.

To address such issues, some comparative neural networks use dilated convolution. FIG. 4B depicts the selection of pixels using dilated convolution (also known as "atrous convolution") with a dilation rate d of 3, where the dilated convolutional kernel selects pixels from the input feature map 410 that are spaced d pixels apart from each other. Dilated convolution has been widely used in semantic segmentation because it can capture a larger receptive field for each output feature (e.g., each output pixel) without significant additional computational cost. In the particular example shown in FIG. 4B, the dilated convolutional kernel selects a center pixel, as shown with a circle, and eight pixels, as shown with Xs, from a 7×7 region of the input feature map 410, thereby allowing the dilated convolutional kernel of size 3×3 to capture information from the 7×7 area (e.g., from a 7×7 receptive field) without increasing the computational demands of the convolution operation because only 3×3 (nine) values of the input feature map 410 are used in the convolution (rather than the forty-nine values that would be included by a full 7×7 pixel convolutional kernel).

However, as shown in FIG. 4B, dilated convolution inserts holes (e.g., the blank spaces 404 in the grid of FIG. 4B) between the center pixel (shown by a circle) and the chosen pixels (shown by Xs). The number of holes or missing values depends on the dilation rate parameter d (e.g., the spacing between the selected pixels). When the dilation rate d is very large, a substantial amount of information in the holes (e.g., the gaps between the selected pixels) will be lost.

Accordingly, some aspects of the present disclosure relate to performing box filtering (e.g., including a box filtering layer in a neural network) before dilated convolution to collect information contained in the holes. In some embodiments, performing box filtering can reduce information loss associated with dilated convolution, especially when the dilation rate d is large. Generally, box filtering relates to convolving an input feature map 410 with a box filtering kernel that aggregates or summarizes the values within the kernel.

According to some embodiments, for a given dilation rate d, box filtering is applied with a stride of 1 (e.g., the kernel steps through the input feature map 410 a stride number of pixels at a time such that the next center pixel along a direction is a stride number of pixels away from the previous center pixel) and box filtering kernel having a window size of F×F set in accordance with Equation 1:

$$F = \left\lceil \frac{d-1}{2} \right\rceil \times 2 + 1$$

By applying box filtering to an input feature map 410 and supplying the box filtered feature maps to a dilated convolutional layer, the kernel of the dilated convolutional layer selects values that contain information summarized from the holes between the points selected by the kernel, thereby allowing the information from the holes to be passed through to lower layers of the neural network while preserving the computational efficiency of dilated convolutional.

Figure 4C:
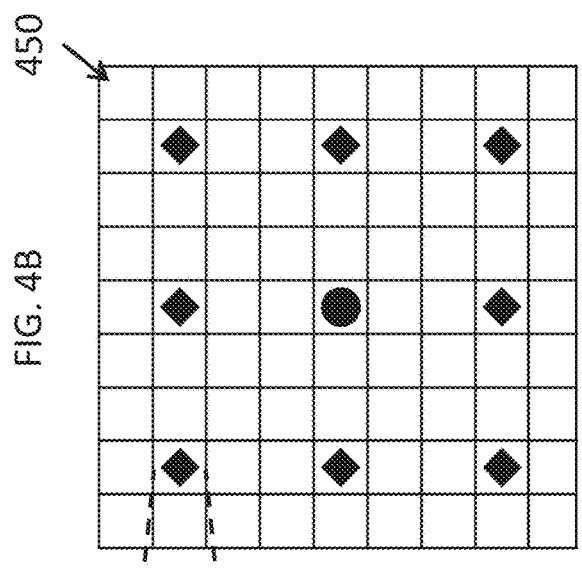
FIG. 4C is an illustration of a portion of a computation of box filtering followed by dilated convolution, according to one embodiment of the present disclosure.
Figure 4C:
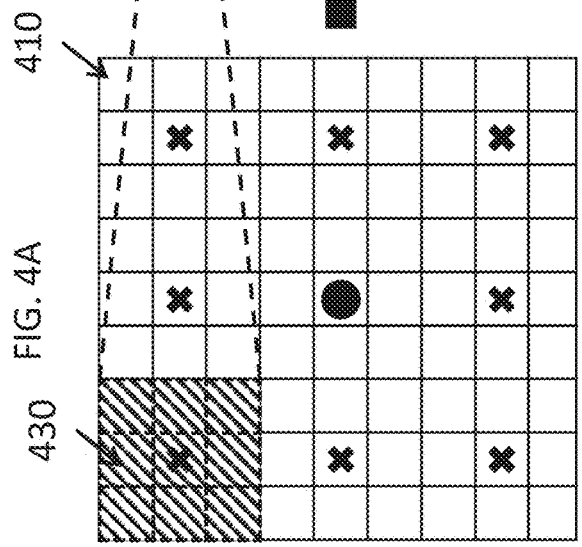

FIG. 4C is an illustration of a portion of a computation of box filtering followed by dilated convolution, according to one embodiment of the present disclosure. In particular, FIG. 4C depicts an embodiment where the dilation rate d is 3 (as was the case in shown in FIG. 4B). For example, the left side of the illustration of FIG. 4C, shows the nine pixels selected in accordance with the dilated convolution of FIG. 4B using a circle for the center pixels and Xs for the eight pixels spaced d pixels away from each other.

As noted above, in the example shown in FIG. 4C, the dilation rate d is 3. As such, the box filtering kernel has a window size as set in accordance with Equation 1, (defined above):

$$\left\lceil \frac{3-1}{2} \right\rceil \times 2 + 1 = 3$$

Accordingly, the box filtering kernel 430 shown in FIG. 4C has a size of 3×3. In the particular part of the computation shown in FIG. 4C selects the pixel at the top left X and the eight adjacent pixels of the input feature map 410. The box filtering layer computes an aggregate of the nine selected values to generate a new pixel feature, as shown by the diamond on the right side of FIG. 4C and connected by the dashed lines to the pixels in the box filtering kernel 430. In the example shown in FIG. 4C, the output of a box filtering layer implementing the box filtering operation is a box filtered feature map 450 where each pixel in the box filtered feature map 450 is a box filtered value of the input feature map 410 (e.g., the backbone feature map). In more detail, each of the diamonds on the right side of FIG. 4C corresponds to the application of the box filtering kernel to the nine pixels centered at each of the Xs in the left side of FIG. 4C.

Generally, the box filtering kernel computes a value that aggregates or summarizes the values surrounding the center pixel into a single value. This may include, for example, a mean (average), a weighted average, a mode, a maximum, or a minimum.

As one specific example, in one embodiment the box filtering kernel computes a mean of the values in its window. For example, when the window size is 3, then the box filtering kernel computes the sum of the values divided by nine:

$$\begin{bmatrix} 1/9 & 1/9 & 1/9 \\ 1/9 & 1/9 & 1/9 \\ 1/9 & 1/9 & 1/9 \end{bmatrix}$$

As another example, the aggregate may be weighted toward the center of the kernel with a value k:

$$\begin{bmatrix} 1/k+8 & 1/k+8 & 1/k+8 \\ 1/k+8 & 1/k+8 & 1/k+8 \\ 1/k+8 & 1/k+8 & 1/k+8 \end{bmatrix}$$

In larger windows, the weights may decrease based on distance from the center of the kernel.

Figure 5:
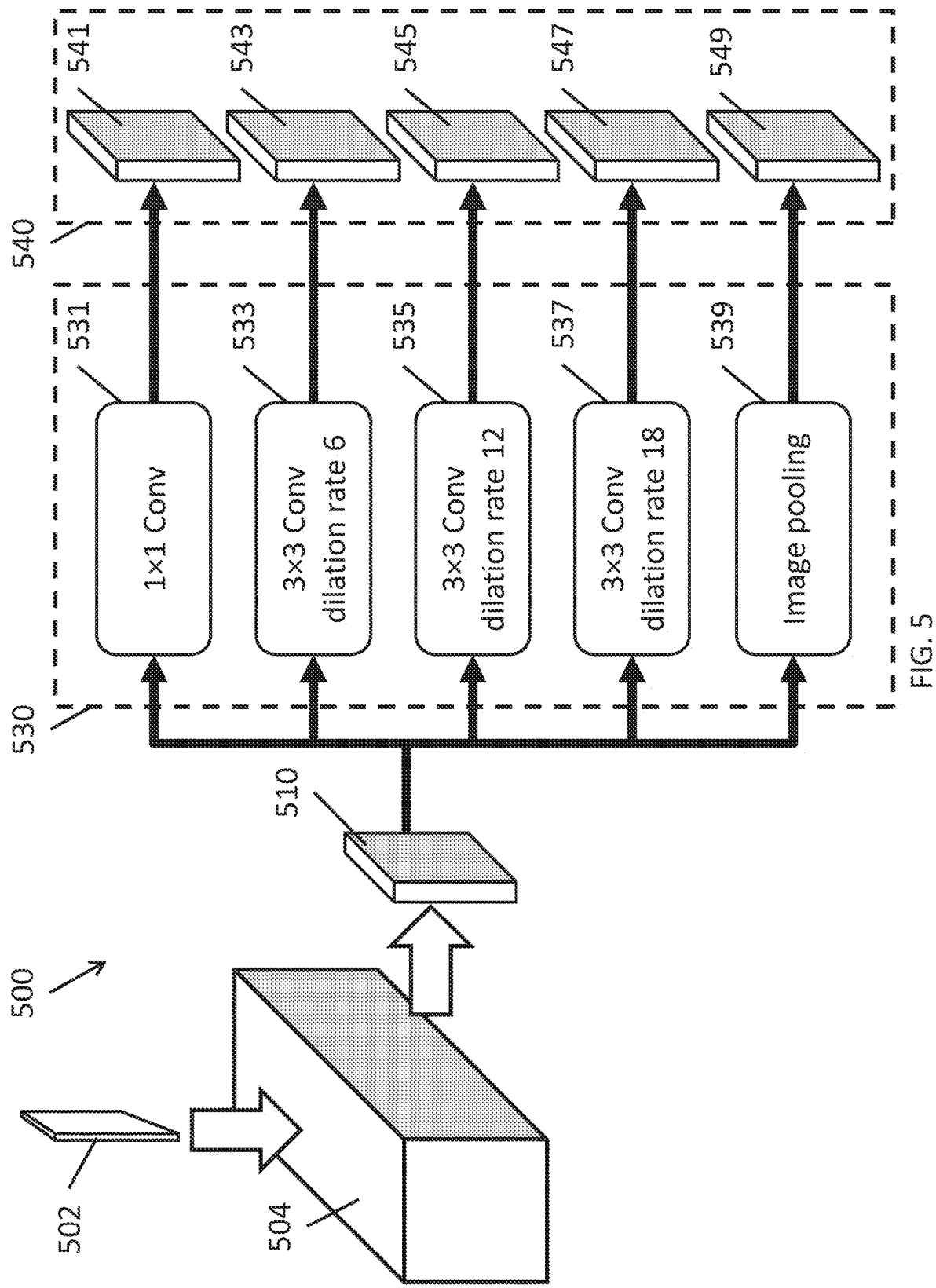
FIG. 5 depicts a portion of a comparative convolutional neural network in which the output of a backbone neural network is supplied to an atrous spatial pyramid pooling layer.

FIG. 5 depicts a portion of a comparative convolutional neural network in which the output of a backbone neural network is supplied to an atrous spatial pyramid pooling (ASPP) layer. In the portion of the particular comparative convolutional neural network 500 shown in FIG. 5A, an input image 502 is supplied to a backbone neural network 504 which computes a backbone feature map 510 (e.g., similar to the input feature map 410 shown in FIGS. 4A, 4B, and 4C) that is supplied as input to the ASPP layer 530. The ASPP layer 530 includes a plurality of ASPP dilated convolutional layers which compute a set of ASPP output features 540, where each part (or dilated convolutional layer) of the ASPP layer 530 takes as input the same input feature map 410 (e.g., the dilated convolutional layers compute corresponding ASPP output features independently and logically in parallel, without requiring the ASPP output features by computed simultaneously in parallel). The ASPP layer 530 shown in FIG. 5 includes a 1×1 convolutional layer 531 computing ASPP output features 541, a 3×3 dilated convolutional layer 533 having a dilation rate d of 6 and computing ASPP output features 543, a 3×3 dilated convolutional layer 535 having a dilation rate d of 12 and computing ASPP output features 545, a 3×3 dilated convolutional layer 537 having a dilation rate d of 18 and computing ASPP output features 547, and an image pooling layer 539 computing ASPP output features 549.

Figure 6:
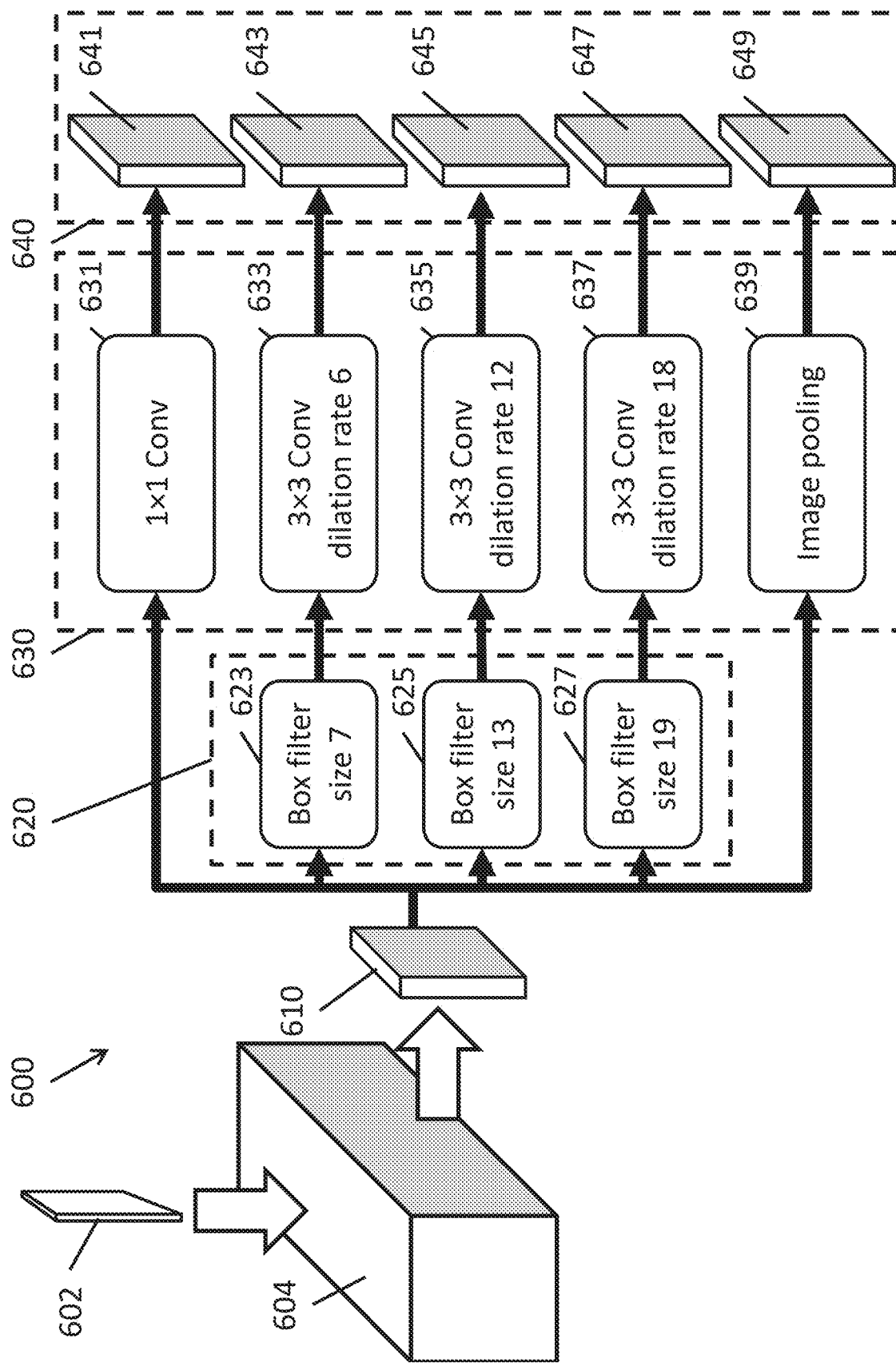
FIG. 6 depicts a portion of a convolutional neural network in which the output of a backbone neural network is supplied to a box filtering layer and the box filtered inputs are supplied to an atrous spatial pyramid pooling network, according to some embodiments of the present disclosure.

FIG. 6 depicts a portion of a convolutional neural network in which the output of a backbone neural network is supplied to a box filtering layer and the box filtered inputs are supplied to an atrous spatial pyramid pooling network, according to some embodiments of the present disclosure. Generally, a convolutional neural network includes one or more convolutional layers of neurons, and may also include one or more fully connected layers in addition to other layers configured to perform other computations. Such a convolutional neural network may be represented in the memory of a computer system in accordance with the connection between the layers and the parameters configuring the layers, where the connections identify how data is supplied to each layer from previous (or upstream) layers and the parameters may configure how the layers transform the input data into output data (e.g., in the case of convolutional layers, the parameters may set the values of the convolutional kernel of a given layer, and in the case of fully connected layers, the parameters may set weights and biases of the individual neurons of the layers). A neural network may be trained on a computer system that includes a processor and a memory storing the convolutional neural network and training data for training the network (e.g., using backpropagation and gradient descent). The computer system may be a multi-core and/or multi-processor system. In some embodiments, the computer system is a cluster of separate computers that are connected together and cooperatively train the convolutional neural network. The training process generates a set of parameters for configuring the neural network to perform a trained function, such as to compute a segmentation map from an input image.

In some embodiments, the trained convolutional neural network is deployed for use, e.g., on a device such as a mobile phone, a digital camera, or a self-driving vehicle, by storing the convolutional neural network (e.g., the architecture including the arrangement of layers and connections) and its trained parameters onto the device. For example, if the device includes a processor and memory, the convolutional neural network may be stored in the memory and the processor may perform the forward propagation (or inference) operation on input data as configured by the parameters. In some devices the processor may be, or may include, a graphics processing unit (GPU) or neural processing unit (NPU) may be used to accelerate the performance of inference operations, where the processor may store the convolutional neural network (e.g., its layers, connections, and parameters). Accordingly, the device may use the trained convolutional network deployed thereon to perform inference operations, such as computing a segmentation map from an input image, and using the output of the trained convolutional neural network to perform functions such as tuning the capture parameters of a digital camera system (e.g., adjusting exposure and focus based on detected objects of interest in the segmentation map) or controlling a self-driving vehicle (e.g., controlling the vehicle to avoid collisions with objects detected in the segmentation map).

An input image 602 is supplied to the portion of the convolutional neural network 600 shown in FIG. 6, which includes a backbone neural network 604 configured to compute a backbone feature map 610 from the input image 602, where the backbone feature map 610 is shown in FIG. 6 as being supplied as the input feature map to the downstream portions of the convolutional neural network. Examples of backbone neural networks include MoblieNetV2 (see, e.g., Sandler, Mark, et al. "Mobilenetv2: Inverted residuals and linear bottlenecks." *Proceedings of the IEEE Conference on Computer Vision and Pattern Recognition.* 2018), MoblieNetV3 (see, e.g., Howard, Andrew, et al. "Searching for mobilenetv3." arXiv preprint arXiv:1905.02244 (2019)), MnasNet (see, e.g., Tan, Mingxing, et al. "Mnasnet: Platform-aware neural architecture search for mobile." *Proceedings of the IEEE Conference on Computer Vision and Pattern Recognition.* 2019), and Xception (see, e.g., Chollet, Francois. "Xception: Deep learning with depthwise separable convolutions." *Proceedings of the IEEE conference on computer vision and pattern recognition.* 2017).

The input feature map 610 is supplied to a 1×1 convolutional layer 631 and an image pooling layer 639, which compute feature maps 641 and 649, respectively. However, a box filtering layer 620 including box filtering sublayers 623, 625, and 627 is placed in front of the dilated convolutional layers 633, 635, and 637, where the box filters have window sizes that are set in accordance with Equation 1, above and where the box filters may have a stride of 1. Specifically, the 3×3 dilated convolutional layer 633 having a dilation rate d of 6 is fed by a box filtering sublayer 623 having a window size $$7\left(\left\lceil\frac{6-1}{2}\right\rceil\times 2+1=7\right),$$

the 3×3 dilated convolutional layer 635 having a dilation rate d of 12 is fed by a box filtering sublayer 625 having a window size of $$13\left(\left\lceil\frac{12-1}{2}\right\rceil\times 2+1=13\right),$$

and the 3×3 dilated convolutional layer 637 having a dilation rate d of 18 is fed by a box filtering sublayer 627 having a window size of $$19\left(\left\lceil\frac{18-1}{2}\right\rceil\times 2+1=19\right)$$

to compute feature maps 643, 645, and 647, respectively. Accordingly, the ASPP layer 630 computes feature maps 640, which includes feature maps 641, 643, 645, 647, and 649.

While one example of an embodiment of the present disclosure is shown herein with respect to FIG. 6 showing three dilated convolutional layers having dilation rates of 6, 12, and 18, embodiments are not limited thereto and may also include placing a box filtering layer in front of dilated convolutional layers having a different number of different dilation rates (e.g., more than three dilated convolutional layers) and/or different dilation rates (e.g., rates different from 6, 12, and 18). In addition, while the box filters are shown directly upstream or directly in front of the dilated convolution layers, embodiments of the present disclosure are not limited thereto and, in some embodiments, additional processing layers may be disposed between the box filtering layer 620 and the ASPP layer 630.

As such, aspects of embodiments of the present disclosure relate to applying box filtering in front of dilated convolutional layers (or atrous convolution layers), thereby allowing information from the holes or gaps in the dilated convolutional kernels to be included in the dilated convolution operation, and thereby improving the performance of the convolutional neural network compared to without using box filtering.

Attention Aware Atrous Spatial Pyramid Pooling (ASPP)

Some aspects of embodiments relate to applying attention awareness to atrous spatial pyramid pooling (ASPP) networks. For example, a Deep Encoder-Decoder based convolutional neural network (CNN) according to some embodiments includes an attention aware ASPP (AAASPP) that includes: a global attention feature (GAF) based ASPP, selective ASPP, and spatial attention based refinement (SAR), as discussed in more detail below.

Figure 7A:
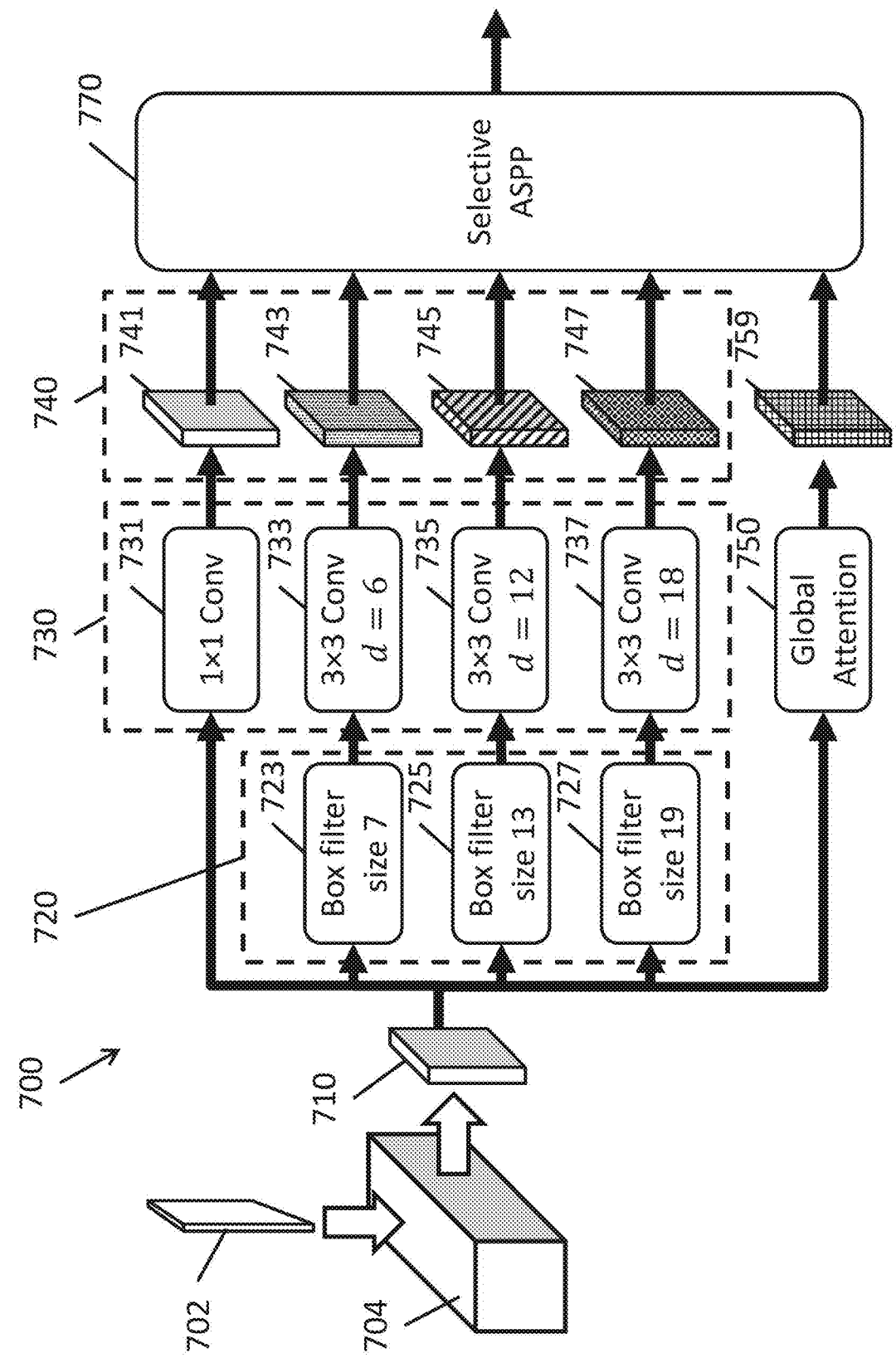
FIG. 7A depicts a first portion of an attention aware atrous spatial pyramid pooling (AAASPP) module, according to one embodiment of the present disclosure.
Figure 7B:
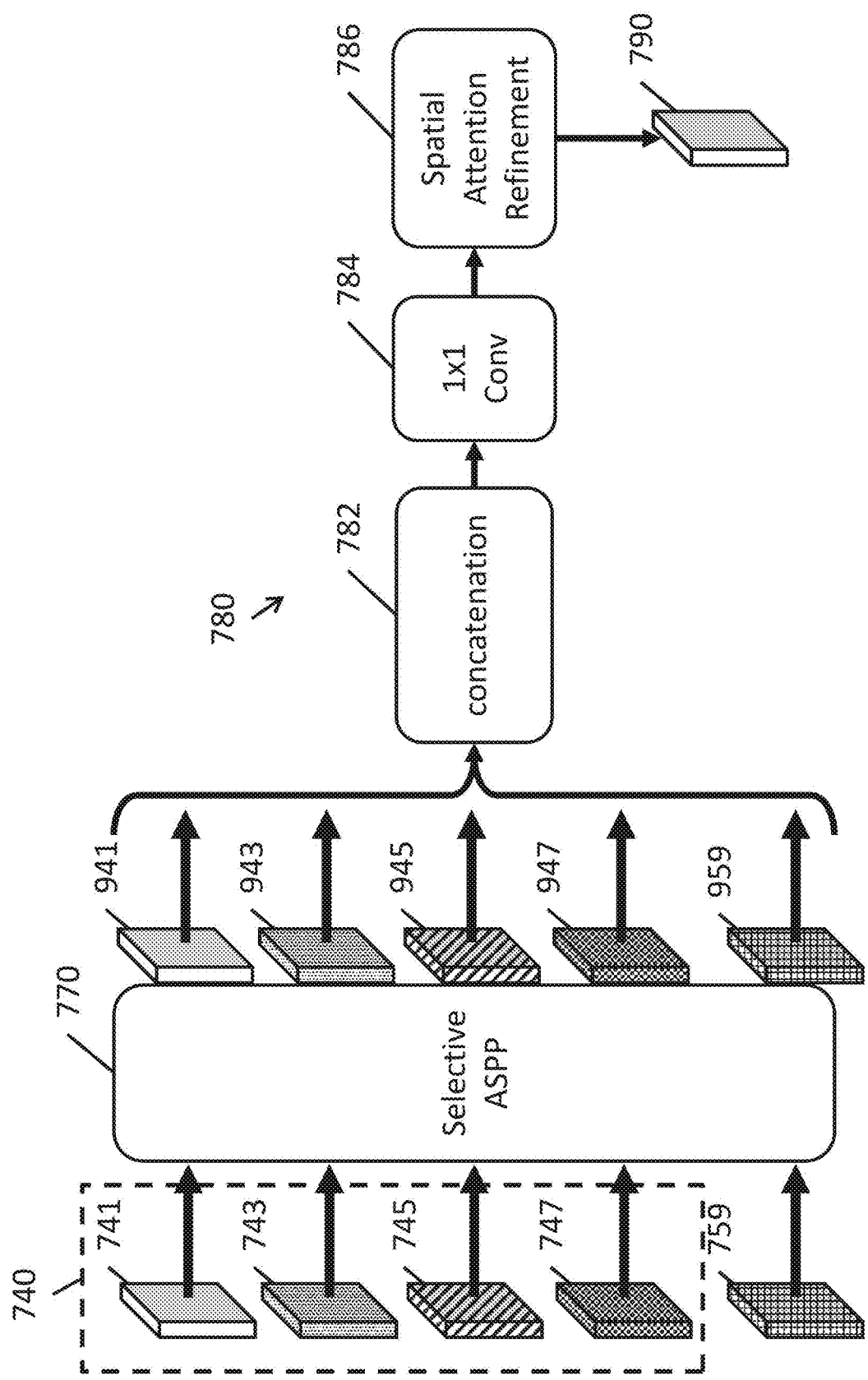
FIG. 7B depicts a second portion of an AAASPP module, according to one embodiment of the present disclosure.

FIG. 7A depicts a first portion of an attention aware atrous spatial pyramid pooling (AAASPP) module, according to one embodiment of the present disclosure. FIG. 7B depicts a second portion of an AAASPP module, according to one embodiment of the present disclosure. A backbone neural network 704 (e.g., MoblieNetV2, MoblieNetV3, MnasNet, or Xception, as discussed above with respect to the embodiment shown in FIG. 6) is configured to receive an input image 702 and compute a backbone feature map 710, which is shown in FIG. 7A as being supplied as input feature map to an ASPP layer 730 through a box filtering layer 720, where the box filtering kernels of the box filtering layer have window sizes set in accordance with the dilation rates of their corresponding layers of the ASPP layer 730. The ASPP layer 730 includes a 1×1 convolutional layer 731, and box filtering layer 720 including box filtering sublayers 723, 725, and 727 are placed in front of the dilated convolutional layers 733, 735, and 737, where the box filters have window sizes that are set in accordance with Equation 1, above and where the box filters may have a stride of 1. However, embodiments of the present disclosure are not limited thereto. For example, some embodiments of the present disclosure may include an ASPP layer 730 without a box filtering layer 720. In addition, the number of different dilated convolutional layers may be greater than 3, less than 3, and/or may have different dilation rates than those shown in the embodiment shown in FIG. 7A.

One difference between the embodiment shown in FIGS. 7A and 7B and the embodiment shown in FIG. 6 is that the image pooling layer 639 of FIG. 6 is replaced with a global attention layer 750, which computes global attention feature map 759, described in more detail below with respect to FIGS. 8A and 8B.

As shown in FIGS. 7A and 7B, the 1×1 convolutional layer 731, the dilated convolutional layers 733, 735, and 737, and the global attention layer 750 generate respective output feature maps, which are supplied as selective ASPP channels 741, 743, 745, 747, and 759, respectively. The outputs of the ASPP layer 740, along with the global attention feature map 759, are supplied to a selective ASPP layer 770 as selective ASPP channels 741, 743, 745, 747, and 759, also described in more detail below with respect to FIG. 9.

Global Attention Feature Based ASPP

Some aspects of embodiments of the present disclosure relate to a Global Attention Feature based ASPP, which is based on a comparative self-attention based spatial attention layer. See, e.g., Fu, Jun, et al. "Dual attention network for scene segmentation." *Proceedings of the IEEE Conference on Computer Vision and Pattern Recognition.* 2019. Self-attention based spatial attention is able to capture long range context information of any shape, whereas the dilated convolution of an ASPP layer can capture only the local context information inside a grid (e.g., within the receptive fields of the dilated convolutional layers). Aspects of embodiments of the present disclosure relate to the use of an ASPP layer with a sparsemax-based spatial attention layer, referred to herein as a global attention layer.

While FIG. 7A depicts the global attention layer 750 used in conjunction with a box filtering layer 720 in front an ASPP layer 730, embodiments of the present disclosure are not limited thereto. For example, in some embodiments, the global attention layer 750 is used in conjunction with a standard ASPP layer without a box filtering layer (e.g., the global attention layer 750 may replace the image pooling layer 539 in the architecture shown in FIG. 5).

Figure 8:
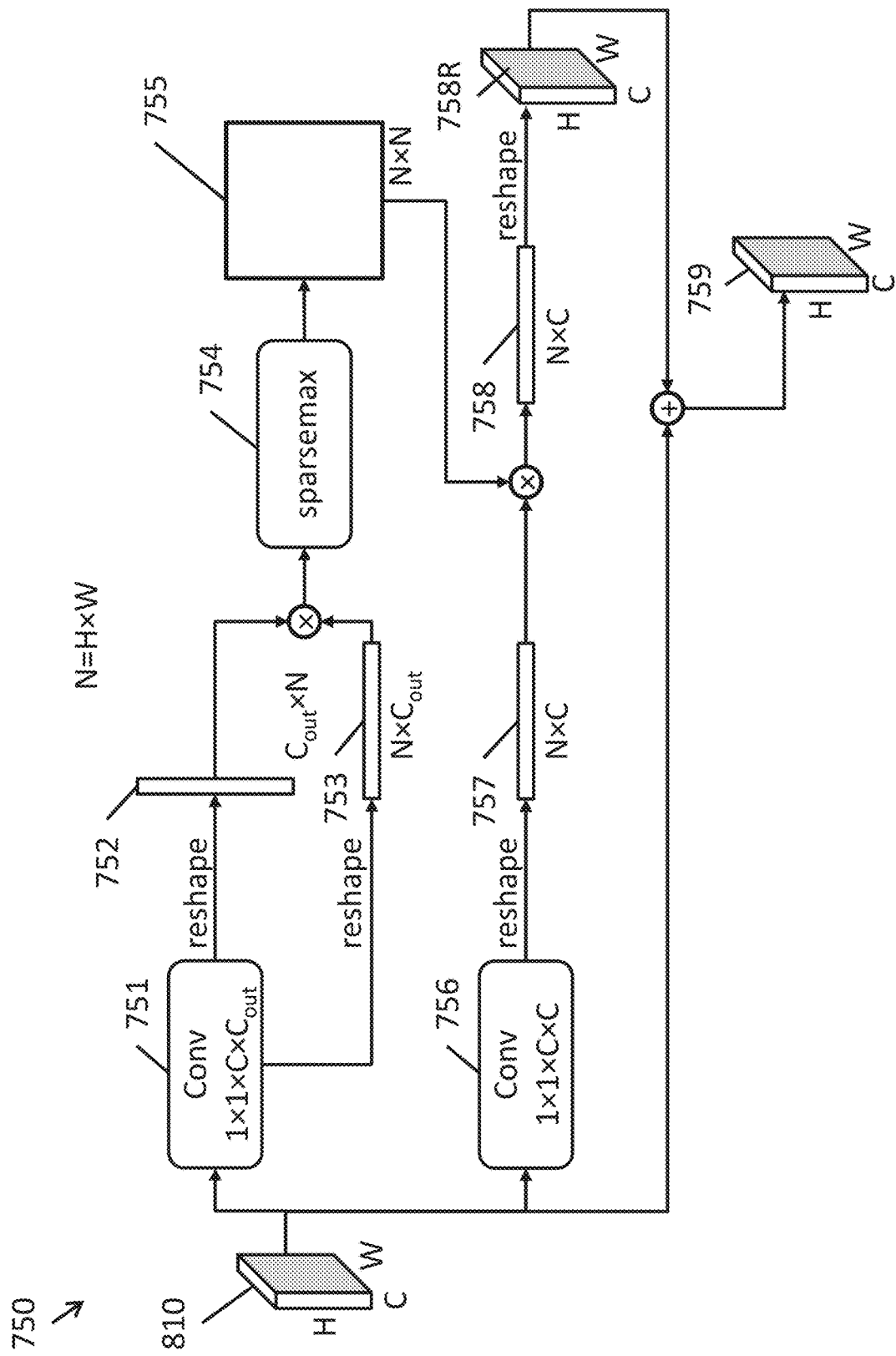
FIG. 8 depicts a global attention layer according to one embodiment of the present disclosure.

FIG. 8 depicts a global attention layer according to one embodiment of the present disclosure. In the embodiment shown in FIG. 8, pairwise correlations are calculated for each pair of pixels in an input feature map 810 (in some embodiments, this corresponds to the backbone feature map 710 discussed above with respect to FIG. 7A). As shown in FIG. 8, the input feature map 810 has dimensions H×W×C, which correspond to the height, width, and channels of the input feature map (e.g., the channels of the input feature map 810 may correspond to the number of different convolutional kernels in the final convolutional layer of the convolutional backbone network that generated the input feature map 810). To compute the pairwise correlations, in one embodiment, a 1×1×C×$C_{out}$ convolution 751 is applied to the input feature map 810, and the result is reshaped to form a $C_{out}$×N feature map 752 and also reshaped to form an N×$C_{out}$ feature map 753. The value $C_{out}$ may correspond to the number of output classes of the segmentation map (e.g., different classifications of objects in the image). The $C_{out}$×N feature map 752 and the N×$C_{out}$ feature map 753 are multiplied to compute the pairwise correlations. As a result, the un-normalized attention map can be calculated where each value in the map is the correlations between two pixels. The un-normalized attention map is then supplied to a normalization module 754 to normalize the attention map by computing the sparsemax activations of the pairwise correlations, to compute a normalized attention map 755 having dimensions N×N.

In addition, a 1×1×C×C convolution 756 is applied to the input feature map 810 to compute an N×C feature map 757. The N×C feature map 757 is multiplied by the N×N normalized attention map 755 to compute an N×C feature map 758, which is reshaped to dimensions matching the input feature map (H×W×C) 758R, thereby projecting the normalized attention map 755 to the input feature map 810 to compute the global attention feature map 759, such that each feature in each pixel of the global attention feature map 759 is the weighted sum of all the features at other pixel locations, as weighted by the values in the normalized attention map 755.

In contrast to the global attention described above, the comparative spatial attention module uses a softmax function instead of a sparsemax function in the normalization module 754 shown in FIG. 8. However, using softmax generates would generate weights for noisy features (which would appear in the attention map) whereas sparsemax forces zero attentions to unimportant and noisy features.

As such, using sparsemax instead of softmax concentrates the resulting attention map 755 on large values which represent the similarities between two pixels. In other words, using sparsemax strengthens the similarities and enlarges the attentions for similar pixels while forcing zero attentions (e.g., zero weights) on dissimilar pixels. In contrast, using softmax would cause dissimilar pixels to contribute some weight in the attention map 755.

Accordingly, a global attention layer 750 using a sparsemax attention function in accordance with embodiments of the present disclosure computes an attention map in which noisy features are suppressed when compared to an attention map generated by a comparative spatial attention layer using a softmax activation function.

Selective ASPP

Figure 9:
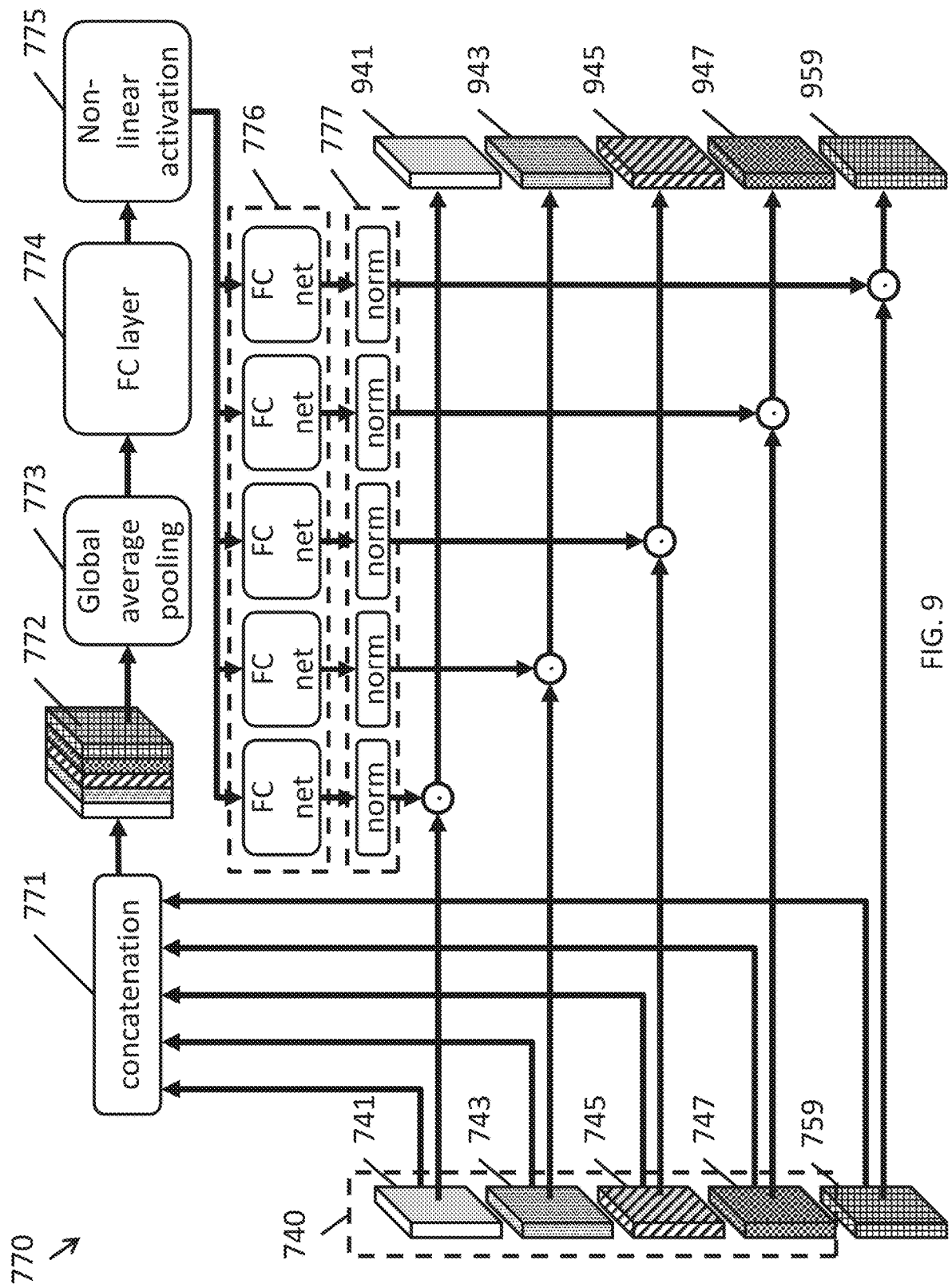
FIG. 9 depicts a selective atrous spatial pyramid pooling (ASPP) layer according to one embodiment of the present disclosure.

As shown in FIGS. 7A and 7B, the outputs of the ASPP layer and the global attention feature map 759 output by the global attention layer 750 are supplied (as components of selective ASPP channels 741, 743, 745, 747, and 759) to a selective ASPP layer 770. FIG. 9 depicts a selective atrous spatial pyramid pooling (ASPP) layer according to one embodiment of the present disclosure.

As shown in FIG. 9, the outputs of the ASPP layer (the ASPP output features or ASPP output feature maps) and the global attention feature map 759 output by the global attention layer 750 are supplied (as parts of the selective ASPP channels 741, 743, 745, 747, and 759) to a selective ASPP layer 770 and concatenated by a concatenation module 771 to generate concatenated features 772. Global average pooling 773 is then applied to the concatenated features 772 to capture the global context information for each channel, and one or more fully connected neural network layers 774 to reduce the dimensionality of the concatenated features 772, followed by a non-linear activation layer 775 (e.g., implementing the Rectified Linear Unit or ReLU operation or another appropriate non-linear activation function) is applied to the output of the fully connected neural network layers 774. The output of the non-linear activation layer 775 is then supplied to a plurality of separate fully connected (FC) neural networks 776, each FC net corresponding to one of the inputs to the selective ASPP layer 770 (e.g., the selective ASPP channels 741, 743, 745, 747, and 759 shown in FIG. 9). Each FC neural network is used to change the dimension of the output of the non-linear activation layer 775 to have dimensions matching a corresponding one of the inputs to the selective ASPP layer (dimensions matching a corresponding one of the selective ASPP channels). The outputs of the FC nets 776 are then supplied to normalization modules 777 (e.g., each configured to apply a sigmoid function) to compute attention feature maps for each of the channels (e.g., the selective ASPP channels 741,

743, 734, 747, and 759 shown in FIG. 9), and an element-wise dot product is computed between the resulting attention feature maps and the selective ASPP channels 741, 743, 734, 747, and 759 to compute corresponding selective ASPP output feature maps 941, 943, 934, 947, and 959.

Spatial Attention Based Refinement (SAR)

As shown in FIG. 7B, according to one embodiment of the present disclosure, the selective ASPP output feature maps 941, 943, 934, 947, and 959 of the selective ASPP layer 770 are provided to an output neural network 780 configured to compute a segmentation map from the output feature maps. According to one embodiment, the output neural network 780 includes a concatenation layer 782 that supplies the concatenated features to a 1×1 convolutional layer 784 of the output neural network, and the output of the 1×1 convolutional layer 784 is supplied to a spatial attention refinement layer 786 of the output neural network 780. According to some embodiments, the spatial attention refinement layer 786 is substantially similar to the global attention layer 750, with the difference that the normalization module 754 may apply, in various embodiments, a sparsemax function or a softmax function with temperature to normalize the attention map. In some embodiments, the output 790 of the spatial attention refinement layer 786 is used as the segmentation map to be computed by a deep convolutional neural network (DCNN) 700 in accordance with the present disclosure. However, embodiments of the present disclosure are not limited thereto and the output 790 may be used as an intermediate feature map that is further processed, e.g., by additional layers of a deep neural network (e.g., a fully connected network and/or a convolutional neural network).

Experimental Results

Various embodiments of the present disclosure are tested on the ADE20k dataset (see, e.g., Zhou, Bolei, et al. "Scene parsing through ade20k dataset." *Proceedings of the IEEE conference on computer vision and pattern recognition.* 2017) and the Cityscapes dataset (see, e.g., Cordts, Marius, et al. "The cityscapes dataset for semantic urban scene understanding." *Proceedings of the IEEE conference on computer vision and pattern recognition.* 2016) using different backbone neural networks.

In the results presented below, the mean Intersection-Over-Union (mIoU) metric is used to evaluate the quality of the segmentation maps computed by the neural networks, and the Boundary F-score (BF) is used to evaluate the quality of the boundary of the segmentation map. For both mIoU and BF, higher scores indicate better results.

In one experiment to demonstrate the impact of a global attention layer, a deep convolutional neural network (DCNN) using Xception as the backbone neural network with ASPP and image pooling (see, e.g., FIG. 5) was compared against a DCNN using Xception as the backbone neural network with ASPP and global attention layer instead of image pooling, where both networks were trained using the ADE20k dataset.

TABLE 1

| Methods | mIoU (%) |
| --- | --- |
| Xception + ASPP with Image Pooling (baseline) | 45.30 |
| Xception + ASPP with global attention feature | 45.98 |

As seen in Table 1 above, the replacement of an image pooling layer with a global attention layer increases the quality of the segmentation map from 45.30% to 45.98%.

In one experiment to demonstrate the impact of box filtering, a DCNN using MobileNet V2 as the backbone neural network with ASPP was compared against a DCNN using MobileNet V2 as the backbone neural network with box filtering in front of the ASPP layer, where both networks were trained using the ADE20k dataset.

TABLE 2

| Methods | mIoU (%) |
| --- | --- |
| MobileNet V2 + ASPP (baseline) | 36.30 |
| MobileNet V2 + box filtering based ASPP | 36.77 |

As seen in Table 2 above, the addition of box filtering increases the quality of the segmentation map from 36.30% to 36.77%.

In one experiment to demonstrate the impact of using the boundary aware loss function, a DCNN using MnasNet as the backbone neural network was trained using softmax cross entropy loss and then trained again using boundary aware loss, both neural networks being trained using the ADE20k dataset.

TABLE 3

| Methods | mIoU (%) | BF (%) |
| --- | --- | --- |
| MnasNet + softmax cross entropy loss (baseline) | 49.36 | 34.44 |
| MnasNet + boundary aware loss | 49.28 | 38.30 |

As seen in Table 3 above, using a boundary aware loss function instead of the baseline softmax cross entropy loss function has a minor impact on the mIoU score and a significant increase in the Boundary F-score from 34.44% to 38.30%.

In one experiment to demonstrate the impact of selective ASPP and spatial attention based refinement, a DCNN using MnasNet as the backbone neural network and ASPP was used as the baseline, and embodiments of the present disclosure involving a DCNN using MnasNet as the backbone neural network in conjunction with selective ASPP as well as a DCNN using MnasNet as the backbone neural network in conjunction with selective ASPP and spatial attention refinement, all three trained using the Cityscapes dataset.

TABLE 4

| Methods | mIoU (%) |
| --- | --- |
| MnasNet + ASPP (baseline) | 71.1 |
| MnasNet + selective ASPP | 72.6 |
| MnasNet + selective ASPP + spatial attention refinement | 73.3 |

As seen in Table 4 above, replacing ASPP with selective ASPP increases the mIoU from 71.1% to 72.6%, and further adding spatial attention refinement increases the mIoU to 73.3%.

Accordingly, aspects of embodiments of the present disclosure relate to layers and architectures that improve the performance of deep convolutional neural networks (DCNNs) for computing segmentation maps. Some aspects of embodiments of the present disclosure relate to training DCNNs using a boundary aware loss function. Some aspects of embodiments of the present disclosure relate to DCNNs that include a global attention feature. Some aspects of embodiments of the present disclosure relate to DCNNs that include a selective atrous spatial pyramid pooling layer, and some aspects of embodiments of the present disclosure relate to DCNNs that further include a spatial attention refinement layer.

Some aspects of embodiments of the present disclosure relate to a min-cost assignment boundary F-score (mcBF score) in order to evaluate the human perception of quality of a semantic segmentation map, and to measure the effectiveness of boundary aware loss function, which provides a more accurate metric for evaluating the boundary performance than the standard BF score.

Figure 10:
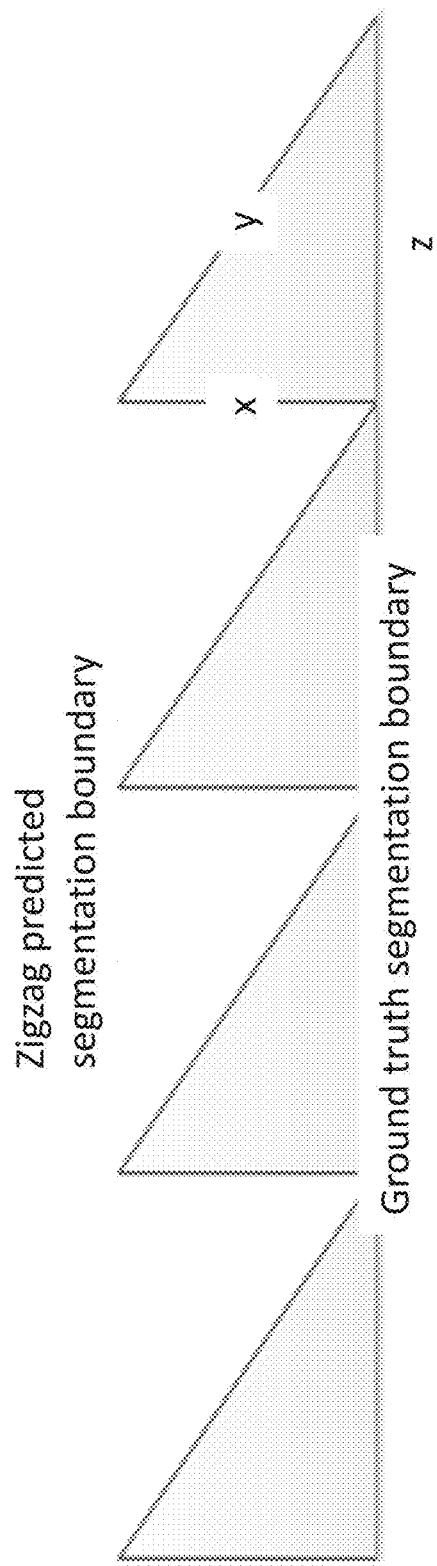
FIG. 10 is an illustration of a zigzag boundary of a boundary F-score.

In some circumstances, the comparative boundary F-score (BF score) may overcount the true positive predictions along the edge of the boundary. In particular, the BF score is computed based on the precision and recall of the classifications. However, precision typically takes on a zigzag pattern, resulting in the overcounting of the true positive predictions. For example, as shown in FIG. 10, the BF score will count the number of true positive as x+y along the zigzag BF score predicted segmentation boundary, so that the precision will be 1.0. However, the actual number of true positive is $$\frac{z}{x+y}$$

(where z is measured along the ground truth segmentation boundary) because the number of true positives cannot be more than the ground truth.

To address the overcounting caused by the comparative BF score, some aspects of embodiments of the present disclosure relate to computing a min-cost assignment boundary F-score (mcBF score).

Figure 11:
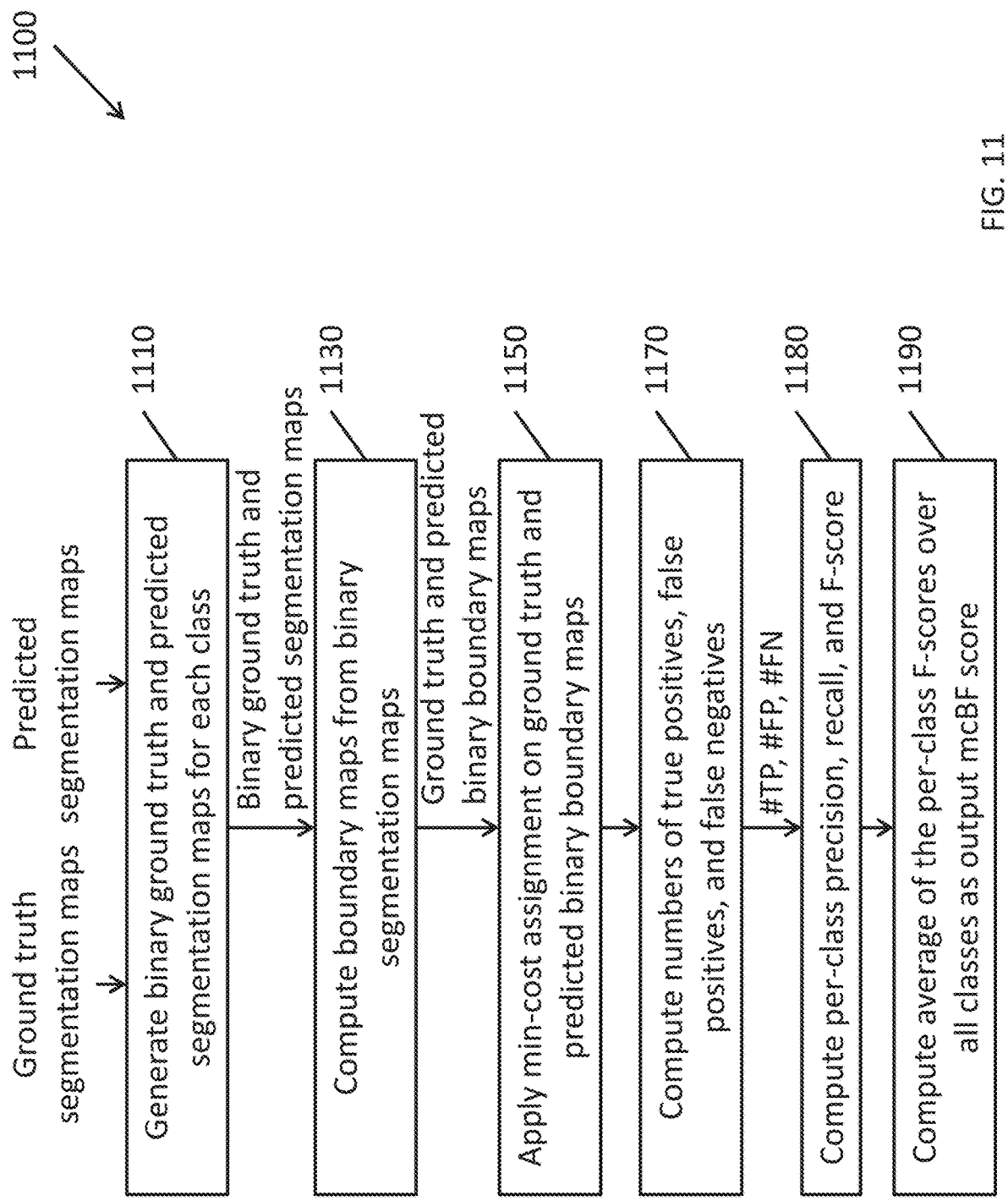
FIG. 11 is a flowchart of a method for computing mcBF score, according to one embodiment of the present disclosure.

FIG. 11 is a flowchart of a method for computing mcBF score, according to one embodiment of the present disclosure. A method 1100 includes, at 1110, for each class c of the output classes of types of objects (e.g., people, plants, sky, walls, etc.), the ground truth and prediction binary segmentation maps are computed by setting the values of all of the pixels that do not belong to class c to 0. At 1130, a plurality of binary boundary maps are generated from the corresponding ground truth and prediction binary segmentation maps. At 1150, min-cost assignment is applied on the ground truth and prediction binary boundary maps to find the one-to-one correspondence between boundary points in the prediction and the ground truth binary boundary maps. Computing the min-cost assignment allows the number of true positives (abbreviated as #TP), false positives (abbreviated as #FP), and false negatives (abbreviated as #FN) to be determined at 1170. Specifically, the number of true positive is the number of boundary points where there is a one-to-one correspondence between the prediction and ground truth boundary maps, the number of false positives is the number of boundary points in the prediction boundary minus the number of true positives, and the number of false negatives is the number of boundary points in the ground truth boundary map minus the number of true positives.

At 1180, the true positives #TP, false positives #FP, and false negatives #FN that were calculated at 1170 are used to calculate the per-class precision (denoted as $p_c$), recall (denoted as $r_c$), and F-score (denoted as $F_c$) (usually the F1-score is used) as shown below:

$$p_c = \frac{\#TP}{\#TP + \#FP}$$

$$r_c = \frac{\#TP}{\#TP + \#FN}$$

$$F_c = \frac{2 p_c r_c}{p_c + r_c}$$

At 1190, the final output mcBF score of the supplied predicted segmentation maps is computed by taking the average of the per-class F-scores $F_c$ over all of the classes c. In the example shown in FIG. 10, the precision derived by the mcBF score described herein will be $$\frac{z}{a+b},$$

which matches with the actual ground truth value.

Figure 12:
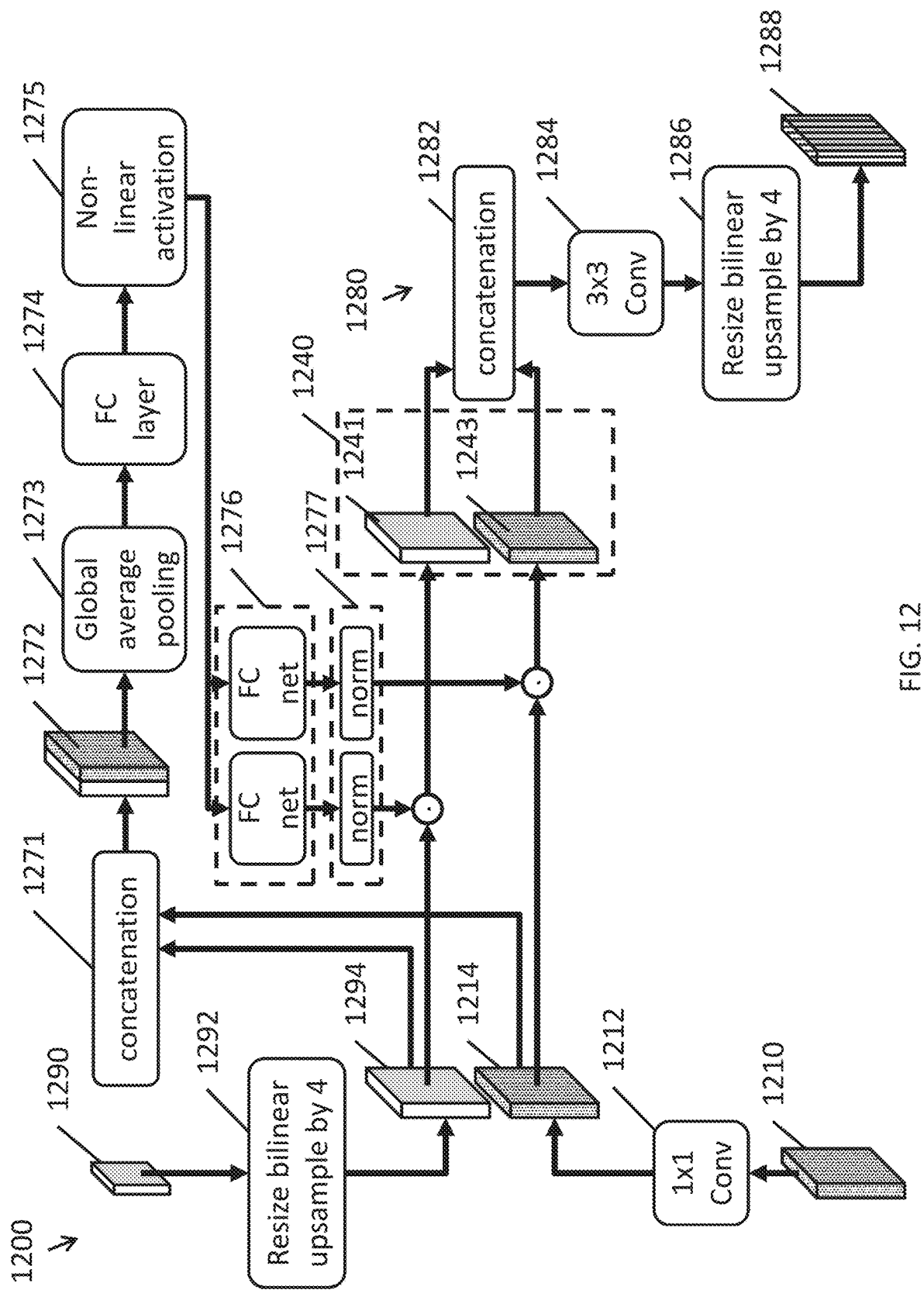
FIG. 12 depicts a portion of a convolutional neural network according to one embodiment of the present disclosure in which selective attention is used to combine information from multiple branches.

FIG. 12 depicts a portion of a convolutional neural network according to one embodiment of the present disclosure in which selective attention is used to combine information from multiple branches. The selective attention network 1200 shown in FIG. 12 is similar to the selective ASPP layer 770 described above with respect to FIG. 9 and the output neural network 780 described above with respect to FIG. 7B. Like reference numerals, as used herein, refer to like components.

In the example embodiment shown in FIG. 12, the selective attention network 1200 is used to combine information from two branches: a backbone feature map 1210 computed by a backbone neural network (examples of which are described above); and a selective attention output 1290 (e.g., the output of a spatial attention refinement layer such as spatial attention refinement 786 shown in FIG. 7B). However, embodiments of the present disclosure are not limited thereto, and, in some embodiments, information (e.g., feature maps) from other portions of neural networks are combined in a similar manner using selective attention networks, such as by adding additional inputs to the selective attention network. As noted above, the embodiment shown in FIG. 12 has two inputs (the backbone feature map 1210 and the selective attention output 1290), compared to the selective ASPP layer 770 shown in FIG. 9, which may be considered to depict five inputs (the four outputs 741, 743, 745, and 747 of the ASPP layer and the global attention feature map 759).

As shown in FIG. 12, the backbone feature map 1210 and the selective attention output 1290 are supplied as inputs to the selective attention network 1200. A convolution module 1212 may apply a 1×1 convolution to the backbone feature map 1210 to compute a backbone feature map input 1214. In addition, some of the inputs to the selective attention network 1200 may have different sizes. For example, the selective attention output 1290 may have a different size (e.g., smaller dimensions) than the backbone feature map 1210. Accordingly, one or more resizing modules 1292 may be used to resize one or more of the inputs. In the example shown in FIG. 12, the selective attention output 1290 is resized by the resizing module 1292 to correspond to the size of the backbone feature map input 1214 by applying bilinear upsampling (or bilinear interpolation) by 4 to compute the selective attention input 1294. In some embodiments, the convolution module 1212 applies a 3×3 convolution instead of a 1×1 convolution. In some embodiments, the convolution module 1212 applies multiple convolutions (e.g., combinations of 1×1 and/or 3×3 convolutions).

The backbone feature map input 1214 and the selective attention input 1294 are concatenated by a concatenation module 1271 to generate concatenated features 1272. Global average pooling 1273 is then applied to the concatenated features 1272 to capture the global context information for each channel, and one or more fully connected neural network layers 1274 to reduce the dimensionality of the concatenated features 1272, followed by a non-linear activation layer 1275 (e.g., implementing the Rectified Linear Unit or ReLU operation or another appropriate non-linear activation function) is applied to the output of the fully connected neural network layers 1274. The output of the non-linear activation layer 1275 is then supplied to a plurality of separate fully connected (FC) neural networks 1276, each FC net corresponding to one of the inputs to the selective attention network 1200 (e.g., the backbone feature map input 1214 and the selective attention input 1294 shown in FIG. 12). Each of the FC neural networks 1276 is used to change the dimension of the output of the non-linear activation layer 1275 to have dimensions matching a corresponding one of the inputs to the selective attention network 1200 (e.g., dimensions matching a corresponding one of the backbone feature map input 1214 and the selective attention input 1294 shown in FIG. 12). The outputs of the FC nets 1276 are then supplied to normalization modules 1277 (e.g., each configured to apply a sigmoid function) to compute selective attention feature maps for each of the inputs (e.g., the backbone feature map input 1214 and the selective attention input 1294 shown in FIG. 12), and an element-wise dot product is computed between the resulting selective attention feature maps and the backbone feature map input 1214 and the selective attention input 1294 to compute corresponding selective attention network feature maps 1240 (including feature maps 1241 and 1243).

The spatial attention network 1200 may further include an output network 1280, which includes a concatenation layer 1282 that concatenates the selective attention network feature maps 1240 to compute concatenated feature maps which are supplied to a convolution layer (e.g., a 3×3 convolution layer) 1284 to apply a convolution operation to the concatenated feature maps, and the convolutional output of the convolution layer 1284 is supplied to a resizing layer 1286 (e.g., a bilinear upsampling layer configured to upsample by 4) to compute an output 1288 of the spatial attention network 1200.

The resulting output 1288 of the spatial attention network may then be used as the segmentation map to be computed by the deep convolutional neural network (DCNN) 700 in accordance with the present disclosure. However, embodiments of the present disclosure are not limited thereto, and the output 1288 may be used as an intermediate feature map that is further processed, e.g., by additional layers of a deep neural network (e.g., a fully connected network and/or a convolutional neural network).

While certain embodiments of the present disclosure have been illustrated and described, it is understood by those of ordinary skill in the art that certain modifications and changes can be made to the described embodiments without departing from the scope of the present disclosure as defined by the following claims, and equivalents thereof.

What is claimed is:

1. A system implementing a neural network configured to perform semantic segmentation of an input image, the system comprising:
a processor; and
memory storing instructions that, when executed by the processor, cause the processor to implement a deep convolutional neural network (DCNN), the DCNN comprising:
a backbone neural network configured to compute a backbone feature map from the input image;
an atrous spatial pyramidal pooling (ASPP) layer comprising a plurality of dilated convolutional layers configured to compute a plurality of ASPP output feature maps based on the backbone feature map, each of the dilated convolutional layers having a corresponding dilation rate;
a box filtering layer comprising a plurality of box filtering sublayers, each of the box filtering sublayers being located between the backbone neural network and a corresponding one of the dilated convolutional layers and having a box filtering kernel with a window size corresponding to the dilation rate of the corresponding one of the dilated convolutional layers, the box filtering layer being configured to:
compute a plurality of box filtered feature maps from the backbone feature map; and
supply the box filtered feature maps as input to the ASPP layer; and
an output neural network configured to compute a segmentation map of the input image based on the ASPP output feature maps.

2. The system of claim 1, wherein the window size of each of the box filtering sublayers is set in accordance with:

$$F = \left\lceil \frac{d-1}{2} \right\rceil \times 2 + 1$$

wherein the window size is F×F, and
wherein d is the dilation rate of the corresponding one of the dilated convolutional layers.

3. A system implementing a neural network configured to perform semantic segmentation of an input image, the system comprising:
a processor; and
memory storing instructions that, when executed by the processor, cause the processor to implement a deep convolutional neural network (DCNN), the DCNN comprising:
a backbone neural network configured to compute a backbone feature map from an input image;
an atrous spatial pyramidal pooling (ASPP) layer comprising a plurality of dilated convolutional layers configured to compute a plurality of ASPP output features based on the backbone feature map, each of the dilated convolutional layers having a corresponding dilation rate;
a selective ASPP layer configured to weight a plurality of selective ASPP channels in accordance with a plurality of corresponding attention feature maps to compute a plurality of selective ASPP output feature maps, the selective ASPP channels comprising the ASPP output features; and
an output neural network configured to compute a segmentation map of the input image based on the ASPP output feature maps.

4. The system of claim 3, wherein the DCNN further comprises a global attention layer configured to compute a global attention feature map based on the backbone feature map in parallel with the dilated convolutional layers, and
wherein the selective ASPP channels comprise the global attention feature map.

5. The system of claim 4, wherein the global attention layer is configured to:
compute a first feature map from the backbone feature map using a 1×1×C×$C_{out}$ convolutional layer;
compute a normalized attention map by applying a sparsemax function to pairwise correlations of the first feature map;
compute a second feature map from the backbone feature map using a 1×1×C×C convolutional layer;
multiply the second feature map by the normalized attention map to compute a third feature map;
reshape the third feature map to match dimensions of the backbone feature map; and
add the reshaped third feature map to the backbone feature map to compute a global attention feature map,
wherein C is a number of channels of the backbone feature map and $C_{out}$ is a reduced dimension of the 1×1×C×$C_{out}$ convolutional layer.

6. The system of claim 3, wherein the selective ASPP layer is configured to:
concatenate the selective ASPP channels to compute concatenated features;
compute global context information of the concatenated features for each channel using global average pooling;
reduce a dimension of the global context information using a fully connected neural network layer;
apply a non-linear activation function to the dimensionally reduced global context information;
for each of the selective ASPP channels, supply the output of the non-linear activation function to a corresponding one of a plurality of fully connected neural networks, each of the fully connected neural networks being configured to compute a corresponding one of plurality of attention feature maps, each of the attention feature maps having dimensions matching a corresponding one of the selective ASPP channels; and
weight each of the selective ASPP channels based on a corresponding one of the attention feature maps to compute the selective ASPP output feature maps.

7. The system of claim 6, wherein the selective ASPP layer is further configured to normalize the attention feature maps.

8. The system of claim 6, wherein the non-linear activation function is a rectified linear unit (ReLU) function.

9. The system of claim 3, wherein the output neural network comprises a 1×1 convolutional layer.

10. The system of claim 3, wherein the output neural network comprises a spatial attention refinement layer configured to:
compute a first feature map from the backbone feature map using a 1×1×C×$C_{out}$ convolutional layer;
compute a normalized attention map by applying a normalization function to pairwise correlations of the first feature map;
compute a second feature map from the backbone feature map using a 1×1×C×C convolutional layer;
multiply the second feature map by the normalized attention map to compute a third feature map;
reshape the third feature map to match dimensions of the backbone feature map; and
add the reshaped third feature map to the backbone feature map to compute the segmentation map,
wherein C is a number of channels of the backbone feature map and $C_{out}$ is a reduced dimension of the 1×1×C×$C_{out}$ convolutional layer.

11. The system of claim 3, wherein the DCNN further comprises a box filtering layer comprising a plurality of box filtering sublayers, each of the box filtering sublayers being located between the backbone neural network and a corresponding one of the dilated convolutional layers and having a box filtering kernel with a window size corresponding to the dilation rate of the corresponding one of the dilated convolutional layers.

12. The system of claim 11, wherein the window size of each of the box filtering sublayers is set in accordance with:

$$F = \left\lceil \frac{d-1}{2} \right\rceil \times 2 + 1$$

wherein the window size is F×F, and
wherein d is the dilation rate of the corresponding one of the dilated convolutional layers.

13. The system of claim 3, wherein the DCNN computes a plurality of model output logits,
wherein the DCNN is trained using a boundary aware loss function and based on training data comprising a plurality of input images and a corresponding plurality of ground truth segmentation maps, where each pixel of the ground truth segmentation maps classifies a corresponding pixel of a corresponding one of the input images as belonging to one of c different class labels, each of the ground truth segmentation maps comprising a plurality of domains, each domain corresponding to a contiguous portion of the ground truth segmentation wherein all pixels in the contiguous portion have a same one of the c different class labels and based on a plurality of boundary maps, where each boundary map identifies boundary regions between different ones of the plurality of domains in a corresponding one of the ground truth segmentation maps, and
wherein the boundary aware loss function L is defined as, for a given input image of the input images, a given corresponding ground truth segmentation map of the ground truth segmentation maps, a given corresponding boundary map of the boundary maps, and a corresponding model output logits of the plurality of model output logits:

$$L = -\sum_i (w(c_i) + \lambda v(c_i) m_i) y_i^t \log(p_i)$$

wherein $c_i$ is a class label of an i-th pixel of the corresponding ground truth segmentation map, $w(c_i)$ is a weight corresponding to the class label of the i-th pixel, λ is a scalar, $v(c_i)$ is the weight corresponding is the class label of the i-th pixel when the i-th pixel is in a boundary region, $m_i$ is a value of the i-th pixel of the corresponding boundary map, $y_i$ is a one-hot vector encoding of the class label $c_i$ of the c different classes, $y_i^t$ is a matrix transpose of $y_i$, and $p_i$ is a vector of confidence values of the corresponding model output logits corresponding to the i-th pixel.

14. The system of claim 3, wherein the DCNN further comprises a selective attention network configured to:
compute concatenated features by concatenating:
a backbone feature map input computed based on the backbone feature map; and
a selective attention input computed based on the segmentation map computed by the output neural network;
compute global context information of the concatenated features for each channel using global average pooling;
reduce a dimension of the global context information using a fully connected neural network layer;
apply a non-linear activation function to the dimensionally reduced global context information;
for each of the backbone feature map input and the selective attention input, supply the output of the non-linear activation function to a corresponding one of a plurality of fully connected neural networks, each of the fully connected neural networks being configured to compute a corresponding one of plurality of selective attention feature maps, each of the selective attention feature maps having dimensions matching a corresponding one of the backbone feature map input and the selective attention input; and
weight the backbone feature map input and the selective attention input based on a corresponding one of the selective attention feature maps to compute a plurality of selective attention network feature maps.

15. The system of claim 14, wherein the selective attention network is further configured to compute the backbone feature map input by applying a 1×1 convolution to the backbone feature map.

16. The system of claim 14, wherein the selective attention network is further configured to compute the selective attention input by resizing the segmentation map computed by the output neural network.

17. The system of claim 16, wherein the resizing is performed by applying bilinear upsampling.

18. The system of claim 14, wherein the spatial attention network comprises an output network configured to:
concatenate the selective attention network feature maps to compute concatenated feature maps;
apply a convolution to the concatenated feature maps to compute a convolutional output; and
resize the convolutional output of the convolution to compute a second segmentation map.

* * * * *